(12) United States Patent
Yamamoto et al.

(10) Patent No.: US 10,708,609 B2
(45) Date of Patent: *Jul. 7, 2020

(54) IMAGE DECODING DEVICE AND IMAGE CODING DEVICE

(71) Applicant: DOLBY INTERNATIONAL AB, Amsterdam Zuidoost (NL)

(72) Inventors: Tomoyuki Yamamoto, Osaka (JP); Tomohiro Ikai, Osaka (JP); Yukinobu Yasugi, Osaka (JP); Takeshi Tsukuba, Osaka (JP)

(73) Assignee: Dolby International AB, Amsterdam Zuidoost (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,895

(22) Filed: Dec. 17, 2018

(65) Prior Publication Data

US 2019/0182497 A1    Jun. 13, 2019

Related U.S. Application Data

(63) Continuation of application No. 15/789,285, filed on Oct. 20, 2017, now Pat. No. 10,194,161, which is a (Continued)

(30) Foreign Application Priority Data

Sep. 28, 2012 (JP) .................................. 2012-218582

(51) Int. Cl.
*H04N 19/44*    (2014.01)
*H04N 19/50*    (2014.01)
(Continued)

(52) U.S. Cl.
CPC .............. *H04N 19/44* (2014.11); *H04N 19/50* (2014.11); *H04N 19/51* (2014.11); *H04N 19/52* (2014.11);
(Continued)

(58) Field of Classification Search
CPC ......... H04N 19/50; H04N 19/51; H04N 19/44
See application file for complete search history.

(56) References Cited

U.S. PATENT DOCUMENTS 9,667,984 B2    5/2017    Yamamoto et al.
9,866,856 B2    1/2018    Yamamoto et al.
(Continued)

FOREIGN PATENT DOCUMENTS

CN    1875637    12/2006
CN    101202923    6/2008
(Continued)

OTHER PUBLICATIONS

Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE, JCTVC-J1003_d7, Jul. 28, 2012, pp. 29, 36-39.

(Continued)

*Primary Examiner* — Robert J Hance

(57) ABSTRACT

A reference picture information decoding unit (13) omits decoding of a reference list sorting presence or absence flag and/or a reference list sorting order based on the number of current picture referable pictures.

5 Claims, 15 Drawing Sheets

Related U.S. Application Data continuation of application No. 15/012,597, filed on Feb. 1, 2016, now Pat. No. 9,866,856, which is a continuation of application No. 14/430,249, filed as application No. PCT/JP2013/076109 on Sep. 26, 2013, now Pat. No. 9,667,984.

(51) Int. Cl.

| | | |
|---|---|---|
| *H04N 19/51* | (2014.01) | |
| *H04N 19/70* | (2014.01) | |
| *H04N 19/61* | (2014.01) | |
| *H04N 19/52* | (2014.01) | |
| *H04N 19/537* | (2014.01) | |
| *H04N 19/573* | (2014.01) | |
| *H04N 19/577* | (2014.01) | |
| *H04N 19/96* | (2014.01) | |

(52) U.S. Cl.
CPC ......... *H04N 19/537* (2014.11); *H04N 19/573* (2014.11); *H04N 19/577* (2014.11); *H04N 19/61* (2014.11); *H04N 19/70* (2014.11); *H04N 19/96* (2014.11)

(56) References Cited

U.S. PATENT DOCUMENTS

| | | | |
|---|---|---|---|
| 2009/0028247 A1* | 1/2009 | Suh | H04H 20/30 375/240.25 |
| 2010/0026882 A1 | 2/2010 | Jeon et al. | |
| 2010/0189173 A1 | 7/2010 | Chen et al. | |
| 2011/0142130 A1* | 6/2011 | Lin | H04N 19/172 375/240.16 |
| 2011/0268195 A1* | 11/2011 | Shigenobu | H04N 19/597 375/240.25 |
| 2012/0189062 A1 | 7/2012 | Sugio et al. | |
| 2012/0207219 A1* | 8/2012 | Someya | H04N 19/597 375/240.16 |
| 2013/0294520 A1* | 11/2013 | Lim | H04N 19/46 375/240.16 |
| 2015/0222914 A1 | 8/2015 | Yamamoto et al. | |
| 2018/0063541 A1 | 3/2018 | Yamamoto et al. | |

FOREIGN PATENT DOCUMENTS

| | | |
|---|---|---|
| CN | 101272494 | 9/2008 |
| CN | 101379829 | 3/2009 |
| CN | 101621685 | 1/2010 |
| CN | 102047670 | 5/2011 |
| CN | 102055977 | 5/2011 |
| CN | 102129290 | 7/2011 |
| CN | 102438141 | 5/2012 |
| CN | 102598670 | 7/2012 |
| CN | 102656890 | 9/2012 |
| WO | WO2012108181 | 8/2012 |

OTHER PUBLICATIONS

Japanese Office Action in Japanese Application No. 2018-098455, dated Jun. 4, 2019, 4 pages (with English translation).
Bross et al., "High Efficiency Video Coding (HEVC) Text Specification Draft 8", Joint Collaborative Team on Video Coding (JCT-VC) of ITU-T SG16 WP3 and ISO/IEC JTC1/SC29/WG11, 10th Meeting, JCTVC-J1003_d7, Jul. 11, 2012, 3 pages.
Bross et al., "High Efficiency Video Coding (HEVC) Text Specification Draft 8", Joint Collaborative Team on Video Coding (JCT-VC) of ITU-T SG19 WP3 and ISO/IEC/JTC1/SC29/WG11 11$^{th}$ Meeting, Jul. 17, 2012.
International Preliminary Report on Patentability in International Application No. PCT/JP2013/076109, dated Mar. 28, 2015, 10 pages.
Office Action issued in China, Application No. 2013800454883, dated Mar. 15, 2017.
Official Communication issued in International Patent Application No. PCT/JP2013/076109, dated Dec. 24, 2013.
Sullivan et al., "Syntax Cleanup for Reference Picture List Modification Signalling," Joint Collaborative Team on Video Coding (JCT-VC) of ITU-T SG 16 WP3 and ISO/IEC JTC 1/SC 29/WG11, 11th Meeting, JCTVC-K0224, Oct. 10, 2012, pp. 1-4.
Chinese Office Action in Chinese Application. No. 201810295286.9, dated Mar. 2, 2020, 10 pages (with English translation).
Chinese Office Action in Chinese Application No. 201810293845.2, dated Mar. 23, 2020, 11 pages (with English translation).
Chinese Office Action in Chinese Application No. 201810295238.X dated Apr. 7, 2020, 11 pages (with English translation).
Chinese Office Action in Chinese Application No. 201810295236.0, dated Apr. 24, 2020, 11 pages (with English translation).

* cited by examiner

FIG. 6

| seq_parameter_set_rbsp( ) { | Descriptor |
|---|---|
| ... | |
|    log2_max_pic_order_cnt_lsb_minus4 | ue(v) |
| ... | |
|    restricted_ref_pic_lists_flag | u(1) |
|    if( restricted_ref_pic_lists_flag ) | |
|      lists_modification_present_flag | u(1) |
| ... | |
|    num_short_term_ref_pic_sets | ue(v) |
|    for( i = 0; i < num_short_term_ref_pic_sets; i++) | |
|      short_term_ref_pic_set( i ) | |
|    long_term_ref_pics_present_flag | u(1) |
|    if( long_term_ref_pics_present_flag ) { | |
|      num_long_term_ref_pics_sps | ue(v) |
|      for( i = 0; i < num_long_term_ref_pics_sps; i++ ) { | |
|        lt_ref_pic_poc_lsb_sps[ i ] | u(v) |
|        used_by_curr_pic_lt_sps_flag[ i ] | u(1) |
|      } | |
|    } | |
| ... | |
| } | |

(A) SPS SHORT-TERM RPS INFORMATION
(B) SPS LONG-TERM RP INFORMATION
(C) SPS LIST MODIFICATION INFORMATION

FIG. 7

| short_term_ref_pic_set( idx ) { | Descriptor |
|---|---|
| num_negative_pics | ue(v) |
| num_positive_pics | ue(v) |
| for( i = 0; i < num_negative_pics; i++ ) { | |
| delta_poc_s0_minus1[ i ] | ue(v) |
| used_by_curr_pic_s0_flag[ i ] | u(1) |
| } | |
| for( i = 0; i < num_positive_pics; i++ ) { | |
| delta_poc_s1_minus1[ i ] | ue(v) |
| used_by_curr_pic_s1_flag[ i ] | u(1) |
| } | |
| } | |

FIG. 8

| slice_header( ) { | Descriptor |
|---|---|
| ... | |
|   if( !dependent_slice_flag ) { | |
|     ... | |
|     if( !IdrPicFlag ) { | |
|       pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else | |
|       short_term_ref_pic_set_idx | u(v) |
|     if( long_term_ref_pics_present_flag ) { | |
|       if( num_long_term_ref_pics_sps > 0 ) | |
|         num_long_term_sps | ue(v) |
|       num_long_term_pics | ue(v) |
|       for( i = 0; i < num_long_term_sps + num_long_term_pics; i++ ) { | |
|         if( i < num_long_term_sps ) | |
|           lt_idx_sps[ i ] | u(v) |
|         else { | |
|           poc_lsb_lt[ i ] | u(v) |
|           used_by_curr_pic_lt_flag[ i ] | u(1) |
|         } | |
|         delta_poc_msb_present_flag[ i ] | u(1) |
|         if( delta_poc_msb_present_flag[ i ] ) | |
|           delta_poc_msb_cycle_lt[ i ] | ue(v) |
|       } | |
|     } | |
|   } | |
|   ... | |
| } | |

(A) SH SHORT-TERM RPS INFORMATION
(B) SH LONG-TERM RP INFORMATION

FIG. 9

| slice_header( ) { | Descriptor |
|---|---|
| ... | |
| if( !dependent_slice_flag ) { | |
| ... | |
| if( slice_type == P \|\| slice_type == B ) { | |
| ... | |
| num_ref_idx_active_override_flag | u(1) |
| if( num_ref_idx_active_override_flag ) { | |
| num_ref_idx_l0_active_minus1 | ue(v) |
| if( slice_type == B ) | |
| num_ref_idx_l1_active_minus1 | ue(v) |
| } | |
| if( lists_modification_present_flag ) | |
| ref_pic_list_modification( ) | |
| } | |
| } | |
| ... | |
| } | |

(C) SH LIST MODIFICATION INFORMATION

FIG. 10

| ref_pic_list_modification( ) { | Descriptor |
|---|---|
| ref_pic_list_modification_flag_l0 | u(1) |
| if( ref_pic_list_modification_flag_l0 && NumPocTotalCurr > 2 ) | |
| for( i = 0; i <= num_ref_idx_l0_active_minus1; i++ ) | |
| list_entry_l0[ i ] | u(v) |
| if( slice_type == B ) { | |
| ref_pic_list_modification_flag_l1 | u(1) |
| if( ref_pic_list_modification_flag_l1 && NumPocTotalCurr > 2 ) | |
| for( i = 0; i <= num_ref_idx_l1_active_minus1; i++ ) | |
| list_entry_l1[ i ] | u(v) |
| } | |
| } | |

FIG. 11

| ref_pic_list_modification( ) { | Descriptor |
|---|---|
|   if (NumPocTotalCurr > 1) | |
|   { | |
|     ref_pic_list_modification_flag_l0 | u(1) |
|     if( ref_pic_list_modification_flag_l0 ) | |
|       for( i = 0; i <= num_ref_idx_l0_active_minus1; i++ ) | |
|         list_entry_l0[ i ] | u(v) |
|     if( slice_type == B ) { | |
|       ref_pic_list_modification_flag_l1 | u(1) |
|       if( ref_pic_list_modification_flag_l1 ) | |
|         for( i = 0; i <= num_ref_idx_l1_active_minus1; i++ ) | |
|           list_entry_l1[ i ] | u(v) |
|     } | |
|   } | |
| } | |

FIG. 12

| slice_header( ) { | Descriptor |
|---|---|
|   ... | |
|   if( !dependent_slice_flag ) { | |
|     ... | |
|     if( slice_type == P \|\| slice_type == B ) { | |
|       ... | |
|       num_ref_idx_active_override_flag | u(1) |
|       if( num_ref_idx_active_override_flag ) { | |
|         num_ref_idx_l0_active_minus1 | ue(v) |
|         if( slice_type == B ) | |
|           num_ref_idx_l1_active_minus1 | ue(v) |
|       } | |
|       if( lists_modification_present_flag<br>        && NumPocTotalCurr > 1) | |
|         ref_pic_list_modification( ) | |
|     } | |
|   } | |
|   ... | |
| } | |

(C) SH LIST MODIFICATION INFORMATION

FIG. 13

| ref_pic_list_modification( ) { | Descriptor |
|---|---|
|   num_poc_total_curr | u(4) |
|   ref_pic_list_modification_flag_l0 | u(1) |
|   if( ref_pic_list_modification_flag_l0 <br>    && num_poc_total_curr > 2 ) | |
|     for( i = 0; i <= num_ref_idx_l0_active_minus1; i++ ) | |
|       list_entry_l0[ i ] | u(v) |
|   if( slice_type == B ) { | |
|     ref_pic_list_modification_flag_l1 | u(1) |
|     if( ref_pic_list_modification_flag_l1 <br>      && num_poc_total_curr > 2 ) | |
|       for( i = 0; i <= num_ref_idx_l1_active_minus1; i++ ) | |
|         list_entry_l1[ i ] | u(v) |
|   } | |
| } | |

FIG. 14

| ref_pic_list_modification( ) { | Descriptor |
|---|---|
|   ref_pic_list_modification_flag_l0 | u(1) |
|   if( slice_type == B ) | |
|     ref_pic_list_modification_flag_l1 | u(1) |
|   if( ref_pic_list_modification_flag_l0 \|\| <br>    ref_pic_list_modification_flag_l1 ) | |
|     num_poc_total_curr | u(4) |
|   if( num_poc_total_curr > 2 ) | |
|   { | |
|     if( ref_pic_list_modification_flag_l0 ) | |
|       for( i = 0; i <= num_ref_idx_l0_active_minus1; i++ ) | |
|         list_entry_l0[ i ] | u(v) |
|     if( ref_pic_list_modification_flag_l1 ) | |
|       for( i = 0; i <= num_ref_idx_l1_active_minus1; i++ ) | |
|         list_entry_l1[ i ] | u(v) |
|   } | |
| } | |

FIG. 15

| ref_pic_list_modification( ) { | Descriptor |
|---|---|
|   ceil_log2_num_poc_total_curr | u(3) |
|   ref_pic_list_modification_flag_l0 | u(1) |
|   if( ref_pic_list_modification_flag_l0 <br>    && ceil_log2_num_poc_total_curr > 1 ) | |
|     for( i = 0; i <= num_ref_idx_l0_active_minus1; i++ ) | |
|       list_entry_l0[ i ] | u(v) |
|   if( slice_type == B ) { | |
|     ref_pic_list_modification_flag_l1 | u(1) |
|     if( ref_pic_list_modification_flag_l1 <br>      && ceil_log2_num_poc_total_curr > 1) | |
|       for( i = 0; i <= num_ref_idx_l1_active_minus1; i++ ) | |
|         list_entry_l1[ i ] | u(v) |
|   } | |
| } | |

FIG. 16

| ref_pic_list_modification( ) { | Descriptor |
|---|---|
|   num_poc_total_curr_greater1_flag | |
|   if (num_poc_total_curr_greater1_flag) | |
|   { | |
|     ref_pic_list_modification_flag_l0 | u(1) |
|     if( ref_pic_list_modification_flag_l0 ) | |
|       for( i = 0; i <= num_ref_idx_l0_active_minus1; i++ ) | |
|         list_entry_l0[ i ] | u(v) |
|     if( slice_type == B ) { | |
|       ref_pic_list_modification_flag_l1 | u(1) |
|       if( ref_pic_list_modification_flag_l1 ) | |
|         for( i = 0; i <= num_ref_idx_l1_active_minus1; i++ ) | |
|           list_entry_l1[ i ] | u(v) |
|     } | |
|   } | |
| } | |

IMAGE DECODING DEVICE AND IMAGE CODING DEVICE

CROSS-REFERENCE TO RELATED APPLICATIONS

This application is a continuation of U.S. application Ser. No. 15/789,285, filed Oct. 20, 2017, which is a continuation of U.S. application Ser. No. 15/012,597, filed Feb. 1, 2016, now issued as U.S. Pat. No. 9,866,856, which is a continuation of U.S. application Ser. No. 14/430,249, filed Mar. 23, 2015, now issued as U.S. Pat. No. 9,667,984, which is a 371 of International Application No. PCT/JP2013/076109, filed Sep. 26, 2013, which claims the benefit of Japanese Application No. 2012-218582, filed Sep. 28, 2012. The entire contents of each of the foregoing applications is hereby incorporated by reference.

TECHNICAL FIELD

The present invention relates to an image decoding device decoding coded data indicating an image and an image coding device generating the coded data by coding the image.

BACKGROUND ART

In order to transmit or record a moving image efficiently, a moving image coding device generating coded data by coding the moving image and a moving image decoding device generating a decoded image by decoding the coded data are used.

As a specific moving image coding scheme, for example, schemes (see NPL 1) proposed in H.264/MPEG-4.AVC and High-Efficiency Video Coding (HEVC) which is its successor codec can be exemplified.

In such a moving image coding scheme, an image (picture) forming a moving image is managed with a hierarchical structure configured to include a slice obtained by splitting an image, a coding unit (also referred to as a coding unit) obtained by splitting the slice, and a block and a partition obtained by splitting the coding unit, and is normally coded/decoded for each block.

In such a moving image coding scheme, generally, a predicted image is generated based on a local decoded image obtained by coding/decoding an input image and a prediction residual (also referred to as a "difference image" or a "residual image") obtained by subtracting the predicted image from the input image (original image) is coded. As a method of generating a predicted image, inter-screen prediction (inter-prediction) and in-screen prediction (intra prediction) can be exemplified.

In the intra-prediction, predicted images in the same frame are sequentially generated based on local decoded images in the same frame.

In the inter-prediction, predicted images are generated by applying motion compensation prediction on reference pictures included in a reference picture list. The reference pictures are a subset of local decoded images in regard to a coded/decoded frame recorded in a picture buffer. Reference picture specifying information indicating which local decoded image in the picture buffer is a reference picture is included in header information. Reference picture order information indicating an order in which reference pictures are arranged in a reference picture list is also included in the header information.

CITATION LIST

Non Patent Literature

NPL 1: "High efficiency video coding (HEVC) text specification draft 8 (JCTVC-J1003_d7)," Joint Collaborative Team on Video Coding (JCT-VC) of ITU-T SG16 WP3 and ISO/IEC JTC1/SC29/WG11 11th Meeting: Stockholm, SE on Jul. 11 to 20, 2012 (disclosed on Jul. 28, 2012)

SUMMARY OF INVENTION

Technical Problem

However, there is a problem that the reference picture specifying information and the reference picture order information according to the related art are not optimum. Specifically, there is a problem that the number of reference pictures available in a specific picture is not considered and information is redundantly transmitted in transmission of the reference picture specifying information and the reference picture order information included in the header information.

The present invention is devised in view of the above-mentioned problem and an object of the present invention is to provide an image decoding device capable of decoding a moving image or an image coding device capable of coding a moving image by transmitting reference picture specifying information and reference picture order information in consideration of the number of reference pictures available in a specific picture and using header information of a smaller coding amount.

Solution to Problem

In order to resolve the above-mentioned problem, according to an aspect of the present invention, there is provided an image decoding device generating a predicted image through motion compensation prediction with reference to one or more reference images recorded on a decoded picture buffer and using the predicted image in image decoding. The image decoding device includes: reference picture set derivation means for deriving a reference picture set to be applied to a target picture; reference picture list generation means for generating a reference picture list available in the target picture based on reference picture list (RPL) modification information decoded from a slice header and the reference picture set derived by the reference picture set derivation means; and reference picture information decoding means for omitting decoding of a part of information included in the RPL modification information based on the number of current picture referable pictures.

Advantageous Effects of Invention

According to the aspect of the present invention, the decoding of at least one of a reference picture list sorting presence or absence flag and a reference list sorting order is omitted based on the number of current picture referable pictures. Accordingly, it is possible to prevent information regarding the reference picture unnecessary in the decoding from being transmitted, and thus there is an advantageous effect capable of decoding a moving image with header information of a smaller coding amount.

According to the aspect of the present invention, the coding of at least one of the reference picture list sorting presence or absence flag and the reference list sorting order is omitted based on the number of current picture referable pictures. Accordingly, it is possible to prevent information regarding the reference picture unnecessary in the decoding from being transmitted, and thus there is an advantageous effect capable of generating coded data so that a moving image is decoded with a header information of a smaller coding amount.

BRIEF DESCRIPTION OF DRAWINGS

FIG. 6 is a diagram exemplifying a part of an SPS syntax table used at the time of decoding of an SPS in a header information decoding section and a reference picture information decoding section of the moving image decoding device.

FIG. 7 is a diagram exemplifying a syntax table of a short-term reference picture set used at the time of decoding of the SPS and at the time of decoding of a slice header in the header information decoding section and the reference picture information decoding section of the moving image decoding device.

FIG. 8 is a diagram exemplifying a part of a slice header syntax table used at the time of decoding of a slice header in the header information decoding section and the reference picture information decoding section of the moving image decoding device.

FIG. 9 is a diagram exemplifying a part of the slice header syntax table used at the time of decoding of a slice header in the header information decoding section and the reference picture information decoding section of the moving image decoding device.

FIG. 10 is a diagram exemplifying a syntax table of reference list sorting information used at the time of the decoding of the slice header in the header information decoding section and the reference picture information decoding section of the moving image decoding device.

FIG. 11 is a diagram exemplifying a syntax table of reference list sorting information used at the time of the decoding of the slice header in the moving image decoding device.

FIG. 12 is a diagram exemplifying another syntax table of the reference list sorting information used at the time of the decoding of the slice header in the moving image decoding device.

FIG. 13 is a diagram exemplifying a syntax table of reference list sorting information used at the time of the decoding of the slice header in the moving image decoding device.

FIG. 14 is a diagram exemplifying another syntax table of the reference list sorting information used at the time of the decoding of the slice header in the moving image decoding device.

FIG. 15 is a diagram exemplifying still another syntax table of the reference list sorting information used at the time of the decoding of the slice header in the moving image decoding device.

FIG. 16 is a diagram exemplifying still another syntax table of the reference list sorting information used at the time of the decoding of the slice header in the moving image decoding device.

DESCRIPTION OF EMBODIMENTS

Figure 1:
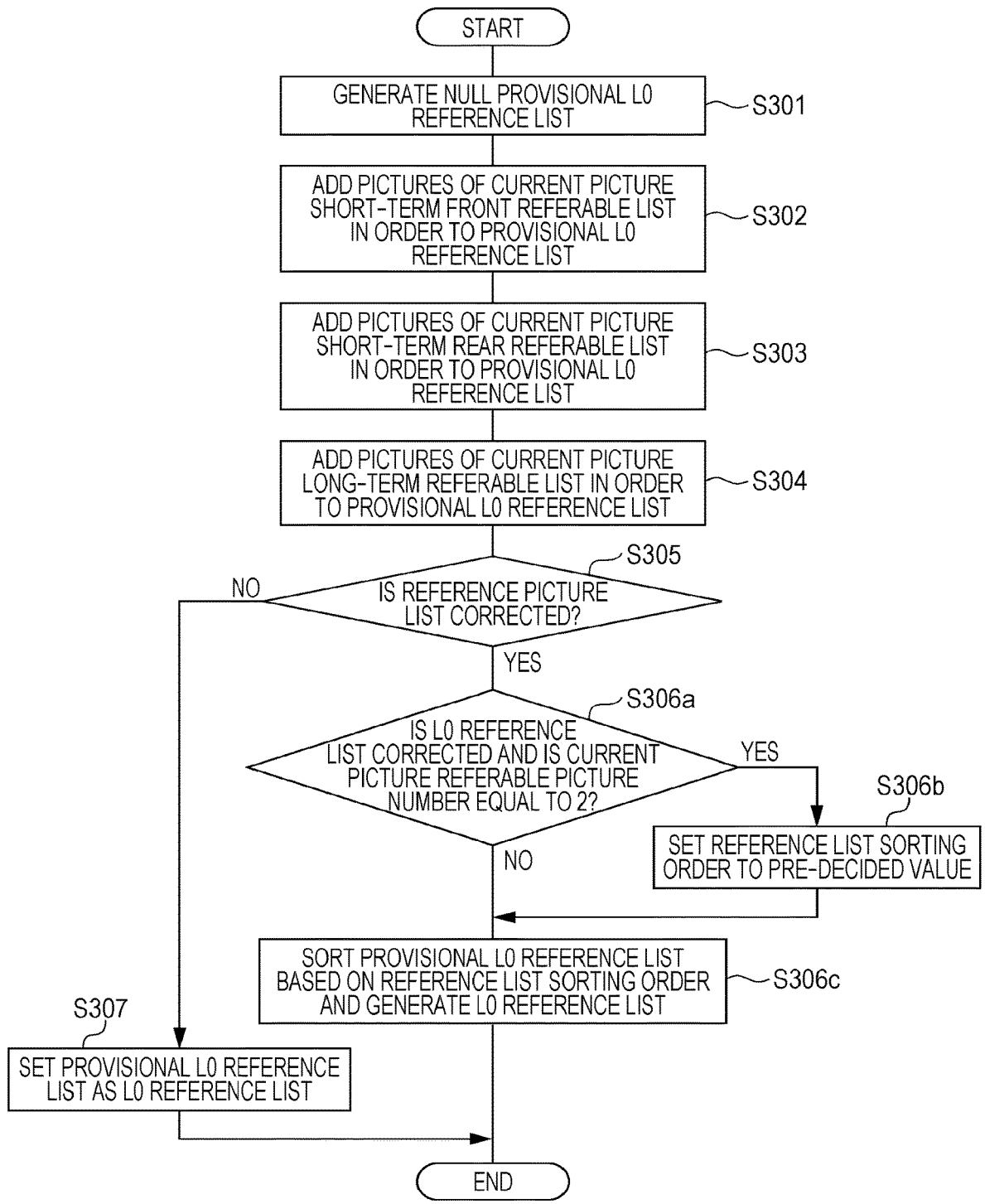
FIG. 1 is a diagram illustrating details of a reference picture list construction process according to an embodiment of the present invention.
Figure 2:
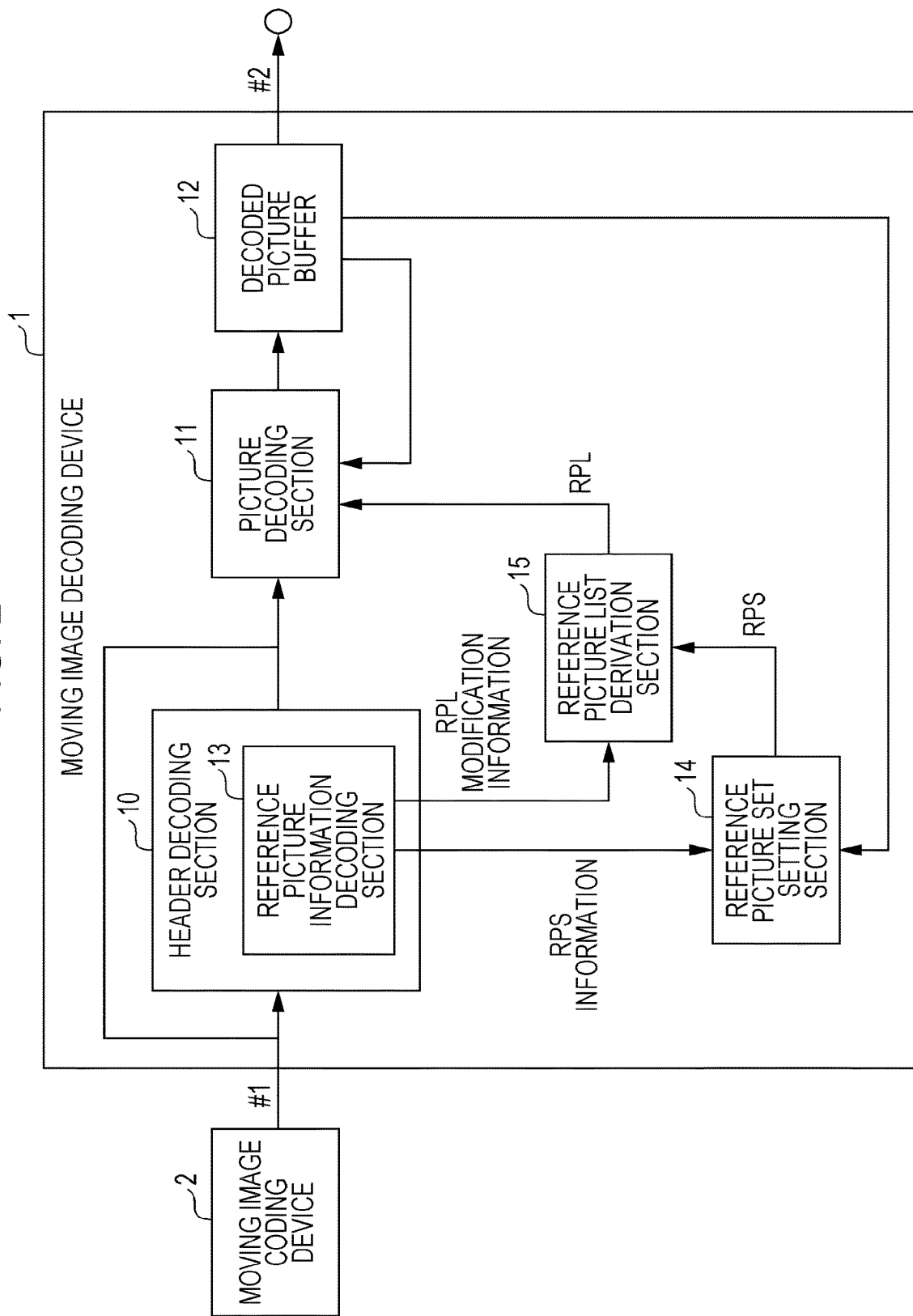
FIG. 2 is a functional block diagram illustrating a schematic configuration of a moving image decoding device according to the embodiment of the present invention.

An embodiment of the present invention will be described with reference to FIGS. 1 to 17. First, the overviews of a moving image decoding device (image decoding device) 1 and a moving image coding device (image coding device) 2 will be described with reference to FIG. 2. FIG. 2 is a functional block diagram illustrating a schematic configuration of the moving image decoding device 1.

A technology adopted in the H.264/MPEG-4.AVC standard and a technology proposed in High-Efficiency Video Coding (HEVC) which is its successor codec are mounted on the moving image decoding device 1 and the moving image coding device 2 illustrated in FIG. 2.

The moving image coding device 2 performs entropy coding on the value of a syntax in which transmission from an encoder to a decoder is defined to generate coded data #1 according to such moving image coding schemes.

The coded data #1 coded from a moving image by the moving image coding device 2 is input to the moving image decoding device 1. The moving image decoding device 1 decodes the input coded data #1 and outputs decoded moving image #2 to the outside. Before the detailed description of the moving image decoding device 1, the configuration of the coded data #1 will be described below.

Configuration of Coded Data

A configuration example of the coded data #1 generated by the moving image coding device 2 and decoded by the moving image decoding device 1 will be described with reference to FIG. 3. The coded data #1 includes, for example, a sequence and a plurality of pictures configuring the sequence.

Figure 3:
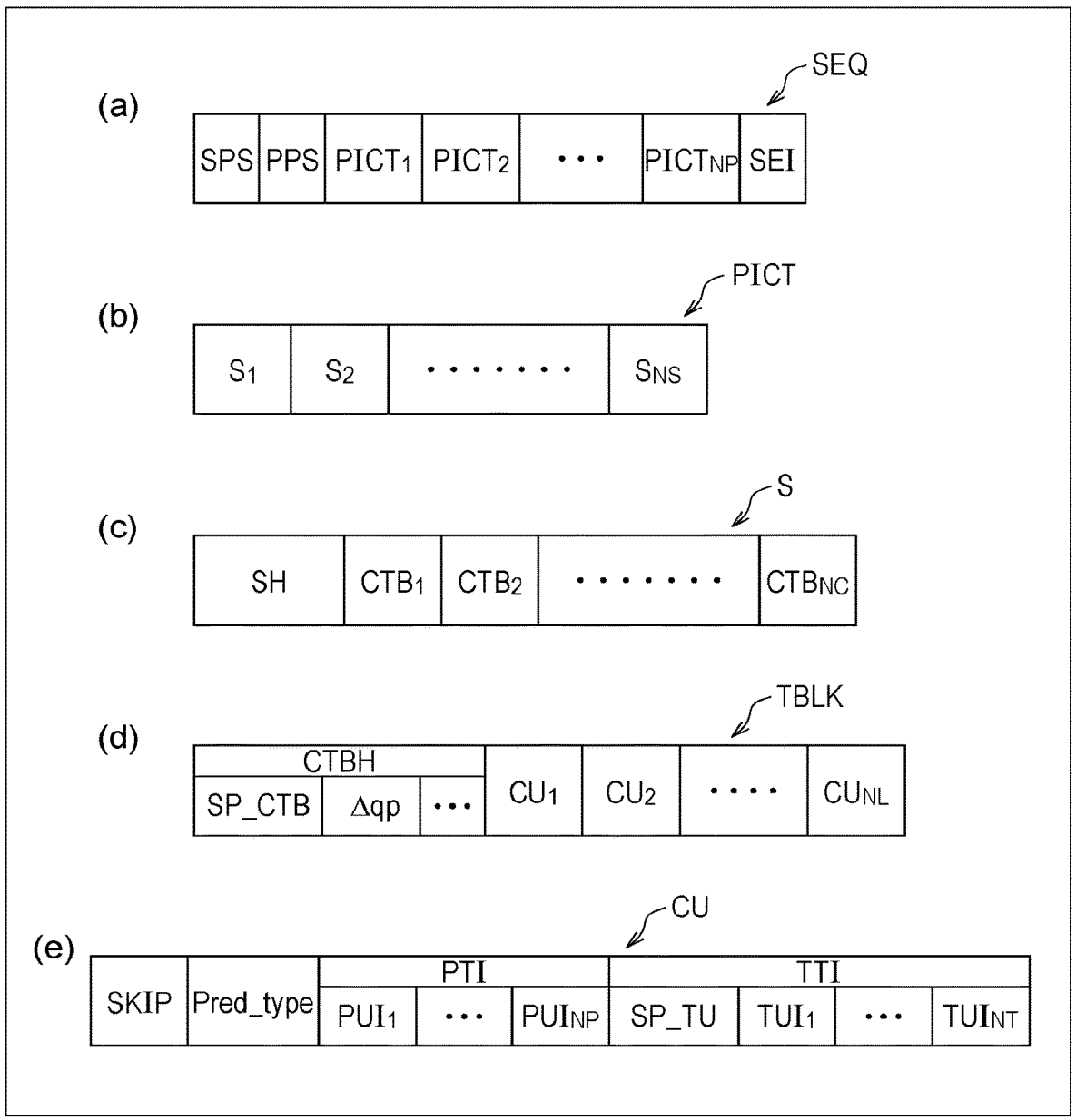
FIG. 3(a) to to (e) of FIG. 3 are diagrams illustrating a sequence layer defining a sequence SEQ, a picture layer defining a picture PICT, a slice layer defining a slice S, a CTB layer defining a coding tree block CTB, and a CU layer defining a coding unit (CU) included in the coding tree block CTB, respectively.

A data hierarchical structure of the coded data #1 is illustrated in FIG. 3. (a) to (e) of FIG. 3 are diagrams illustrating a sequence layer defining a sequence SEQ, a picture layer defining a picture PICT, a slice layer defining a slice S, a CTB layer defining a coding tree block CTB, and a CU layer defining a coding unit (CU) included in the coding tree block CTB, respectively.

Sequence Layer

In the sequence layer, a set of data referred to by the moving image decoding device 1 is defined to decode a processing target sequence SEQ (hereinafter also referred to as a target sequence). As illustrated in (a) of FIG. 3, the sequence SEQ includes a sequence parameter set SPS, a picture parameter set PPS, pictures PICT1 to PICTNP (where NP is a total number of pictures included in the sequence SEQ), and supplemental enhancement information SEI.

In the sequence parameter set SPS, a set of coding parameters referred to by the moving image decoding device 1 is defined to decode the target sequence. The details of the SPS will be described below.

In the picture parameter set PPS, a set of coding parameters referred to by the moving image decoding device 1 is defined to decode each picture in the target sequence. A plurality of PPSs may be present. In this case, one of the plurality of PPSs is selected from the pictures in the target sequence.

Picture Layer

In the picture layer, a set of data referred to by the moving image decoding device 1 is defined to decode the processing target picture PICT (hereafter also referred to as a target picture). As illustrated in (b) of FIG. 3, the picture PICT includes a plurality of slices, that is, slices S1 to SNS (where NS is a total number of slices included in the picture PICT).

When it is not necessary to distinguish the slices S1 to SNS from each other, the slices are described below in some cases by omitting the subscripts of the codes. The same also applies to data which is data included in the coded data #1 to be described below and is other data to which subscripts are appended.

Slice Layer

In the slice layer, a set of data referred to by the moving image decoding device 1 is defined to decode the processing target slice S (also referred to as a target slice). As illustrated in (c) of FIG. 3, the slice S includes a slice header SH and a sequence of coding tree blocks CTB1 to CTBNC (where NC is a total number of coding tree blocks included in the slice S).

The slice header SH includes a coding parameter group referred to by the moving image decoding device 1 to decide a method of decoding the target slice. Slice type designation information (slice_type) designating the types of slices is an example of a coding parameter included in the slice header SH.

As the types of slices which can be designated by the slice type designation information, for example, (1) an I slice using only intra-prediction at the time of coding, (2) a P slice using uni-directional prediction or intra-prediction at the time of coding, and (3) a B slice using uni-directional prediction, bi-directional prediction, or intra-prediction at the time of coding can be exemplified.

The slice header SH may include a reference (pic_parameter_set_id) in the picture parameter set PPS included in the sequence layer.

CTB Layer

In the CTB layer, a set of data referred to by the moving image decoding device 1 is defined to decode a processing target coding tree block CTB (hereinafter also referred to as a target CTB). The CTB is also referred to as a largest coding unit (LCU) or a tree block in some cases.

The coding tree block CTB includes a CTB header CTBH and pieces of coding unit information CU1 to CUNL (where NL is a total number of pieces of coding unit information included in the CTB). The coding unit information CU is associated with a coding unit which is a partial region obtained by splitting the CTB. Hereinafter, the coding unit is referred to as a CU (coding unit). The CU is also referred to a coding block (CB) in some cases.

CTB Header

The CTB header CTBH includes a coding parameter referred to by the moving image decoding device 1 to decide a method of decoding the target CTB. Specifically, as illustrated in (d) of FIG. 3, the CTB header CTBH includes CTB splitting information SP CTB designating a splitting pattern in which the target CTB is split into each CU and a quantization parameter difference Δqp (qp_delta) designating the magnitude of a quantization step.

The CTB splitting information SP CTB is information that indicates a coding tree for splitting the CTB. Specifically, the CTB splitting information SP_CTB is information that designates the shape and size of each CU included in the target CTB and the position of each CU in the target CTB.

The quantization parameter difference Δqp is a difference qp-qp' between a quantization parameter qp in the target CTB and a quantization parameter qp' in the CTB coded immediately before the target CTB.

CU Layer

In the CU layer, a set of data referred to by the moving image decoding device 1 is defined to decode the processing target CU (hereinafter also referred to as a target CU).

Here, a tree structure of data included in the CU will be described before the description of the specific contents of the data included in the coding unit information CU. A coding node is a node of the roots of a prediction tree (PT) and a transform tree (TT). The prediction tree and the transform tree will be described as follows.

In the prediction tree, the coding node is split into one prediction block or a plurality of prediction blocks, and the position and size of each prediction block are defined. In other words, the prediction block is one region or a plurality of non-overlapping regions configuring the coding node.

The prediction tree includes one prediction block or a plurality of prediction block obtained through the above-described splitting.

A prediction process is performed for each prediction block. Hereinafter, the prediction block which is a unit of prediction is also referred to as a prediction unit (PU).

In the transform tree, the coding node is split into one transform block or a plurality of transform blocks, and the position and size of each transform block are defined. In other words, the transform block is one region or a plurality of non-overlapping regions configuring the coding node. The transform tree includes one transform block or the plurality of transform blocks obtained through the above-described splitting.

A transform process is performed for each transform block. Hereinafter, the transform block which is a unit of transform is also referred to as a transform unit (TU).

Data Structure of Coding Unit Information

Next, the specific contents of data included in the coding unit information CU will be described with reference to (e) of FIG. 3. As illustrated in (e) of FIG. 3, the coding unit information CU specifically includes a skip mode flag SKIP, a CU prediction type information Pred type, PT information PTI, and TT information TTI.

Skip Flag

The skip mode flag SKIP is a flag that indicates whether a skip mode is applied to the target CU. When the value of the skip mode flag SKIP is 1, that is, the skip mode is applied to the target CU, the PT information PTI is omitted in the coding unit information CU. The skip mode flag SKIP is omitted in the I slice.

CU Prediction Type Information

The CU prediction type information Pred_type includes CU prediction scheme information PredMode and PU splitting type information PartMode.

The CU prediction scheme information PredMode is used to designate one of intra-prediction (intra CU) and inter-prediction (inter CU) as a predicted image generation method for each PU included in the target CU. Hereinafter, classification of skip, intra-prediction, and inter-prediction in the target CU is referred to as a CU prediction mode.

The PU splitting type information PartMode is used to designate a type of PU splitting which is a pattern in which the target coding unit (CU) is split into each PU. Thus, hereinafter splitting of the target coding unit (CU) into each PU according to the type of PU splitting is referred to as PU splitting.

The selectable type of PU splitting differs depending on a CU prediction scheme and a CU size. More specifically, the selectable type of PU splitting differs between the cases of the inter-prediction and the intra-prediction. The details of the type of PU splitting will be described below.

PT Information

The PT information PTI is information regarding a PT included in the target CU. In other words, the PT information PTI is a set of information regarding one PU or each of the plurality of PUs included in the PT. As described above, since a predicted image is generated using the PU as a unit, the PT information PTI is referred to when the predicted image is generated by the moving image decoding device 1. As illustrated in (e) of FIG. 3, the PT information PTI includes pieces of PU information PUI1 to PUINP (where NP is a total number of PUs included in the target PT) including prediction information in each PU.

The prediction information PUI includes intra-prediction information or inter-prediction information depending on which prediction method the prediction type information Pred_mode designates. Hereinafter, the PU applied to the intra-prediction is referred to as an intra PU and the PU applied to the inter-prediction is referred to as an inter PU.

The inter-prediction information includes motion compensation parameters referred to when the moving image decoding device 1 generates an inter-predicted image through inter-prediction.

As the motion compensation parameters, for example, a merge flag (merge_flag) a merge index (merge_idx), an estimation motion vector index (mvp_idx), a reference image index (ref_idx), an inter-prediction flag (inter_pred flag), and a motion vector residual (mvd) can be exemplified.

The intra-prediction information includes coding parameters referred to when the moving image decoding device 1 generates an intra-prediction image through intra-prediction.

As the intra-prediction parameters, for example, an estimation prediction mode flag, an estimation prediction mode index, and a residual prediction mode index can be exemplified.

TT Information

The TT information TTI is information regarding the TT included in the CU. In other words, the TT information TTI is a set of information regarding one TU or each of the plurality of TUs included in the TT and is referred to when the moving image decoding device 1 decodes residual data. Hereinafter, the TU is also referred to as a transform block.

As illustrated in (e) of FIG. 3, the TT information TTI includes TT splitting information SP_TU used to designate a splitting pattern in which the target CU is split into each transform block and pieces of TU information TUI1 to TUINT (where NT is a total number of blocks included in the target CU).

The TT splitting information SP_TU is specifically information used to decide the shape and the size of each TU included in the target CU and the position of the TU in the target CU. For example, the TT splitting information SP_TU can be realized from information (split_transform_flag) indicating whether the splitting of the target node is performed and information (trafoDepth) indicating a depth of the splitting.

For example, when the size of the CU is 64×64, each TU obtained through the splitting can have a size from 32×32 pixels to 4×4 pixels.

The pieces of TU information TUI1 to TUINT are individual pieces of information regarding one TU or each of the plurality of TUs included in the TT. For example, the TU information TUI includes quantization prediction residuals.

Each quantization prediction residual is coded data generated when the moving image coding device 2 performs the following processes 1 to 3 on a target block which is a processing target block.

Process 1: a prediction residual obtained by subtracting a predicted image from a coding target image is subjected to Discrete Cosine Transform (DCT).

Process 2: a transform coefficient obtained in process 1 is quantized.

Process 3: the transform coefficient quantized in process 2 is subjected to variable-length coding.

The above-described quantization parameter qp indicates the magnitude of a quantization step QP used when the moving image coding device 2 quantizes the transform coefficient (QP=2qp/6).

Moving Image Decoding Device

Hereinafter, the configuration of the moving image decoding device 1 according to the embodiment will be described with reference to FIGS. 1 to 16.

Overview of Moving Image Decoding Device

The moving image decoding device 1 generates a predicted image in each PU, adds the generated predicted image and the prediction residual decoded from the coded data #1 to generate the coded image #2, and outputs the generated decoded image #2 to the outside.

Here, the predicted image is generated referring to the coding parameters obtained by decoding the coded data #1. The coding parameters refer to parameters which are referred to in order to generate a predicted image. The coding parameters include not only motion information (for example, a motion vector, a reference image, reference image list selection information, and motion compensation method selection information) referred to in inter-screen prediction or a prediction parameter such as a prediction mode referred to in the inter-screen prediction but also the size or shape of the PU, the size or shape of the block, and residual data between an original image and a predicted image.

Hereinafter, the picture (frame), the slice, the CTB, the block, and the PU to be decoded are referred to as a target picture, a target slice, a target CTB, a target block, and a target PU, respectively.

Configuration of Moving Image Decoding Device

A schematic configuration of the moving image decoding device 1 will be described below with reference to FIG. 2. FIG. 2 is a functional block diagram illustrating a schematic configuration of the moving image decoding device 1.

As illustrated in FIG. 2, the moving image decoding device 1 includes a header decoding section 10, a picture decoding section 11, a decoded picture buffer 12, a reference picture set derivation section 14, and a reference picture list derivation section 15. The header decoding section 10 includes a reference picture information decoding section 13 therein.

Header Decoding Section

The header decoding section 10 decodes information used to decode the coded data #1 supplied from the moving image coding device 2 in the sequence unit, the picture unit, or the slice unit. The decoded information is output to constituent elements of the moving image decoding device 1 including the picture decoding section 11.

The header decoding section 10 parses the SPS included in the coded data #1 based on the given syntax information and decodes the information used for the decoding in the sequence unit. For example, information related to the image size of a decoded image is decoded from the SPS.

The header decoding section 10 parses the slice header included in the coded data #1 based on the given syntax definition and decodes information used for the decoding in the slice unit. For example, the type of slice is decoded from the slice header.

Reference Picture Information Decoding Section

The reference picture information decoding section is a constituent element of the header decoding section 10 and decodes information regarding the reference picture from the coded data #1. The information regarding the reference picture includes reference picture set information (hereinafter referred to as RPS information) and reference picture list modification information (hereinafter referred to as RPL modification information).

The reference picture set (RPS) indicates a set of pictures which is likely to be used as a reference picture in the target picture or in a picture subsequent to the target picture in the decoding order. The RPS information is information that is decoded from the SPS or the slice header and is information that is used to derive the reference picture set that is set at the time of the decoding of each picture.

The reference picture list (RPL) is a list of candidates of the reference picture to be referred to when motion compensation prediction is performed. Two or more reference picture lists may be present. In the embodiment, an L0 reference picture list (L0 reference list) and an L1 reference picture list (L1 reference list) are assumed to be used. The RPL modification information is information that is decoded from the SPS or the slice header and indicates an order of the reference pictures in the reference picture list.

In the motion compensation prediction, the reference picture recorded at the position of the reference image index (refIdx) on the reference image list is used. For example, when the value of refIdx is 0, the position of 0 of the reference image list, that is, the reference picture in the beginning of the reference image list, is used for the motion compensation prediction.

Since a decoding process for the RPS information and the RPL modification information by the reference picture information decoding section 13 is an important process in the embodiment, the decoding process will be described in detail later.

Here, examples of the reference picture set and the reference picture list will be described with reference to FIG. 4. In (a) of FIG. 4, pictures configuring a moving image are arranged in a display order are illustrated and a numeral in the drawing indicates a POC corresponding to each picture in the drawing. As will be described below in description of the decoded picture buffer, the POC is assigned to each picture in an ascending order of output. The POC of 9 indicated by "curr" is a current decoding target picture.

Figure 4:
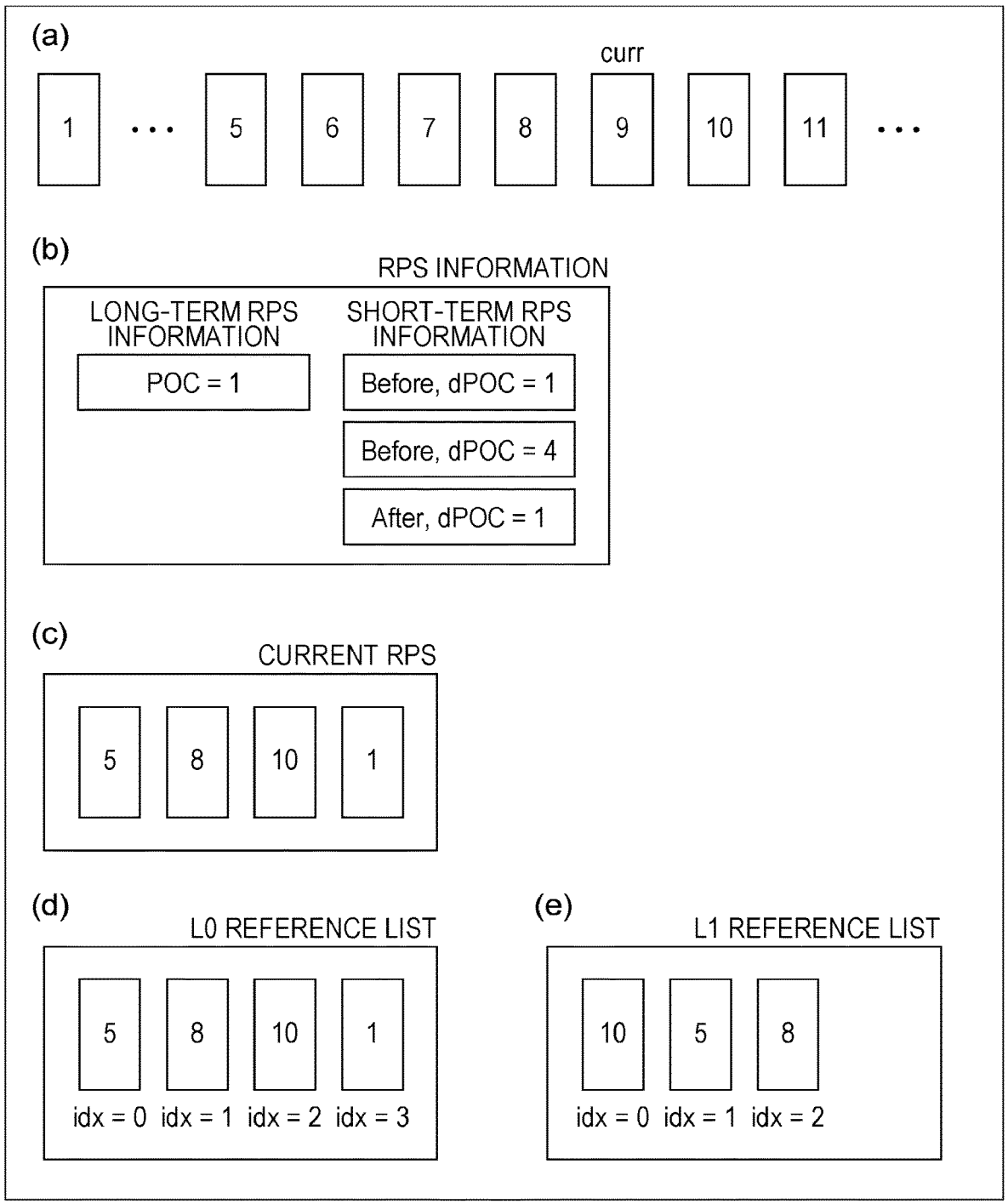
FIG. 4 is a diagram illustrating examples of a reference picture set and a reference picture list, (a) of FIG. 4 is a diagram illustrating pictures configuring a moving image and arranged in a display order, (b) of FIG. 4 is a diagram illustrating an example of RPS information applied to a target picture, (c) of FIG. 4 is a diagram illustrating an example of a current RPS derived at the time of application of the RPS information exemplified in (b) of FIG. 4 when the POC of the target picture is 0, and (d) and (e) of FIG. 4 are diagrams illustrating examples of reference picture lists generated from reference pictures included in the current RPS.

(b) of FIG. 4 illustrates an example of the RPS information applied to the target picture. The reference picture set (current RPS) in the target picture is derived based on the RPS information. The RPS information includes long-term RPS information and short-term RPS information. As the long-term RPS information, the POC of the picture included in the current RPS is directly shown. In the example illustrated in (b) of FIG. 4, the long-term RPS information indicates that the picture of POC=1 is included in the current RPS. In the short-term RPS information, the picture included in the current RPS is recorded with a difference in regard to the POC of the target picture. The short-term RPS information indicated by "Before, dPOC=1" indicates that the picture of the POC smaller by 1 than the POC of the target picture is included in the current RPS. Likewise, "Before, dPOC=4" in the drawing indicates that the picture of the POC is smaller than 4 and "After, dPOC=1" indicates that the picture of the POC larger by 1 is included in the current RPS. "Before" indicates the front of the target picture, that is, the picture earlier than the target picture in the display order. "After" indicates the rear of the target picture, that is, the picture later than the target picture in the display order.

(c) of FIG. 4 illustrates an example of the current RPS derived at the time of application of the RPS information exemplified in (b) of FIG. 4 when the POC of the target picture is 0. The picture of POC=1 indicted by the long-term RPS information is included. The picture that is shown in the short-term RPS information and has the POC smaller by 1 than the target picture (POC=9), that is, the picture of POC=8, is included. Likewise, the pictures of POC=5 and POC=10 shown in the short-term RPS information are included.

(d) and (e) of FIG. 4 illustrate examples of the reference picture lists generated from the reference pictures included in the current RPS. An index (reference picture index) is assigned to each element of the reference picture list (the index is written as idx in the drawing). (d) of FIG. 4 illustrates an example of the L0 reference list. In the L0 reference list, the reference pictures with the POCs of 5, 8, 10, and 1 included in the current RPS are included in this order. (e) of FIG. 4 illustrates an example of the L1 reference list. In the L1 reference list, the reference pictures with the POCs of 10, 5, and 8 included in the current RPS are included in this order. As illustrated in the example of the L1 reference list, it is not necessary to include all of the reference pictures (referable pictures) included in the current RPS in the reference picture list. However, the number of elements of the reference picture list is the number of reference pictures included in the current RPS at most. In other words, the length of the reference picture list is equal to or less than the number of referable pictures which are current pictures.

Figure 5:
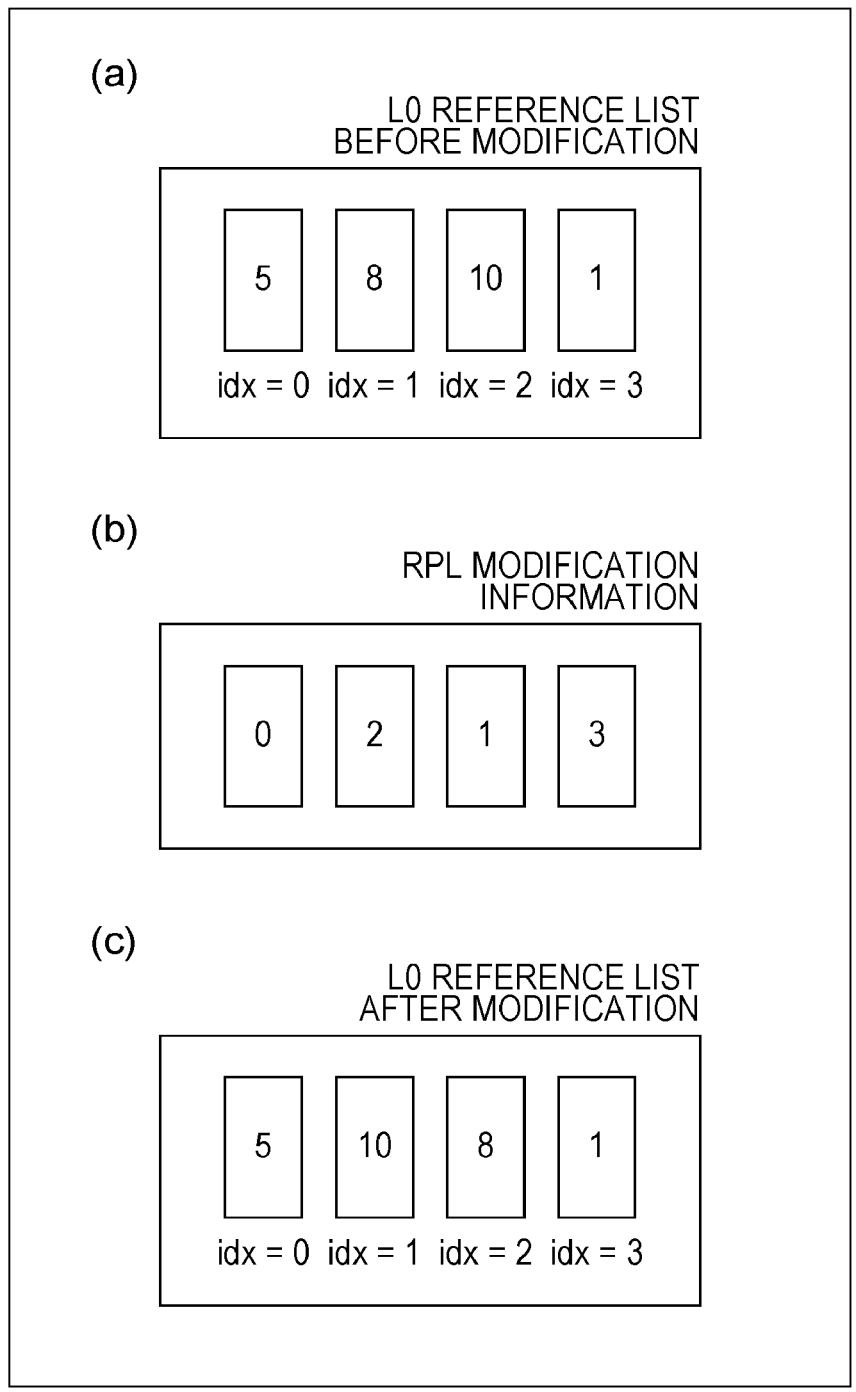
FIG. 5 is a diagram illustrating reference picture list modification examples, (a) of FIG. 5 is a diagram illustrating an L0 reference list before modification, (b) of FIG. 5 is a diagram illustrating RPL modification information, and (c) of FIG. 5 is a diagram illustrating the L0 reference list after the modification.

Next, an example of reference picture list modification will be described with reference to FIG. 5. FIG. 5 exemplifies a reference picture list ((c) of FIG. 5) after modification which can be obtained when RPL modification information ((b) of FIG. 5) is applied to a specific reference picture list ((a) of FIG. 5). The L0 reference list before modification illustrated in (a) of FIG. 5 is the same as the L0 reference list described in (d) of FIG. 4. The RPL modification information illustrated in (b) of FIG. 5 is configured as a list in which the values of the reference picture indexes are elements, and values 0, 2, 1, and 3 are stored in order from the beginning. The RPL modification information indicates that the reference pictures indicated by the reference picture indexes of 0, 2, 1, and 3 included in the reference list before modification are configured as reference pictures of an L0 reference list after modification in this order. (c) of FIG. 5 illustrates the L0 reference list after modification and the pictures with the POCs of 5, 10, 8, and 1 are included in this order.

Picture Decoding Section

The picture decoding section 11 generates a local decoded image of each picture based on the coded data #1, the header information input from the header decoding section 10, the reference picture recorded on the decoded picture buffer 12, and the reference picture list input from the reference picture list derivation section 15 and records the local decoded image on the decoded picture buffer 12.

A summary of the decoding order of a specific picture (target picture) in the picture decoding section 11 is as follows.

(S101) The CTBs configuring the target picture are set sequentially as the target CTBs. Processes of S102 to S106 are performed on each CTB. Thereafter, a process of S107 is performed.

(S102) The CTB splitting information regarding the target CTB is decoded from the coded data #1.

(S103) The CUs configuring the target CTB are set sequentially as the target CUs and the following processes of S104 to S1106 are performed.

(S104) The CU prediction type information and PU splitting information of the target CU are decoded. When the target CU is the inter CU or the skip CU, S104a 1 to S104a 5 are performed. On the other hand, when the target CU is the intra CU, S104b 1 is performed.

(S104a 1) The PUs configuring the target CU are set sequentially as the target PUs and the following processes are performed.

(S104a 2) The motion information regarding the target PU is decoded.

(S104a 3) When L0 prediction is used for the target PU, the reference picture located at a position indicated by the L0 reference index in the L0 reference list is set as the reference picture of the target PU. An L0 predicted image is generated based on a decoding pixel value of the reference picture indicated by an L0 motion vector.

(S104a 4) When L1 prediction is used for the target PU, the reference picture located at a position indicated by the L1 reference index in the L1 reference list is set as the reference picture of the target PU. An L1 predicted image is generated base on a pixel value located at a position indicated by an L1 motion vector in the reference picture.

(S104a 5) When only the L0 prediction is used for the target PU, the L0 predicted image is configured as a predicted image of the target PU. On the other hand, when only the L1 prediction is used for the target PU, the L1 predicted image is configured as a predicted image of the target PU. On the other hand, when both of the L0 prediction and the L1 prediction are used for the target PU (when bi-prediction is used), a weighted average of the L0 predicted image and the L1 predicted image is configured as a predicted image of the target PU.

(S104b 1) An intra-prediction mode corresponding to each PU configuring the target CU is decoded and a predicted image is generated based on an intra-prediction method corresponding to each intra-prediction mode.

(S105) The TT information regarding the target CU is decoded. For each TU configuring the target CU, a transform coefficient is decoded. A prediction residual is generated by applying inverse quantization and inverse transform to the transform coefficient.

(S106) The prediction residual is added to the predicted image to generate a local decoded image before filter application to the target CU.

(S107) An adaptive offset filter and a deblocking filter are applied to the local decoded image before filter application to the target picture to configure a local decoded image of the target picture.

Decoded Picture Buffer

The local decoded image of each picture decoded by the picture decoding section is recorded in association with a picture order count (POC: picture order information) of the picture on the decoded picture buffer 12. The decoded picture buffer 12 decides the POC of an output target at a predetermined output timing. Thereafter, the local decoded image corresponding to the POC is output as one of the pictures configuring the decoded image #2 to the outside.

Reference Picture Set Setting Section

The reference picture set setting section 14 constructs the reference picture set RPS based on the RPS information decoded by the reference picture information decoding section 13 and information regarding the POC and the local decoded image recorded on the decoded picture buffer 12, and then outputs the reference picture set RPS to the reference picture list derivation section 15. The details of the reference picture set setting section 14 will be described below.

Reference Picture List Derivation Section

The reference picture list derivation section 15 generates the reference picture list RPL based on the RPL modification information decoded by the reference picture information decoding section 13 and the reference picture set RPS input from the reference picture set setting section 14, and then outputs the reference picture list RPL to the picture decoding section 11. The details of the reference picture list derivation section 15 will be described below.

Order of Moving Image Decoding Process

An order in which the decoded image #2 is generated from the input coded data #1 by the moving image decoding device 1 is as follows.

(S11) The header decoding section 10 decodes the SPS from the coded data #1.

(S12) The header decoding section 10 decodes the PPS from the coded data #1.

(S13) The pictures indicated by the coded data #1 are set sequentially as the target pictures. Processes of S14 to S17 are performed on each target picture.

(S14) The header decoding section 10 decodes the slice header of each slice included in the target picture from the coded data #1. The reference picture information decoding section 13 included in the header decoding section 10 decodes the RPS information from the slice header and outputs the RPS information to the reference picture set setting section 14. The reference picture information decoding section 13 decodes the RPL modification information from the slice header and outputs the RPL modification information to the reference picture list derivation section 15.

(S15) The reference picture set setting section 14 generates the reference picture set RPS to be applied to the target picture based on the RPS information and a combination of the POC of the local decoded image recorded on the decoded picture buffer 12 and positional information in a memory, and then outputs the reference picture set RPS to the reference picture list derivation section 15.

(S16) The reference picture list derivation section 15 generates the reference picture list RPL based on the reference picture set RPS and the RPL modification information and outputs the reference picture list RPL to the picture decoding section 11.

(S17) The picture decoding section 11 generates the local decoded image of the target picture based on the slice data of each slice included in the target picture and the reference picture list RPL from the coded data #1 and records the local decoded image on the decoded picture buffer in association with the POC of the target picture. The local decoded image recorded on the decoded picture buffer is output as the decoded image #2 to the outside at a proper timing decided based on the POC.

Details of Reference Picture Information Decoding Process

The details of a decoding process for the RPS information and the RPL modification information in the process of S14 in the decoding order will be described.

RPS Information Decoding Process

The RPS information is information that is decoded from the SPS or the slice header to construct the reference picture set. The RPS information includes the following:

1. SPS short-term RPS information: short-term reference picture set information included in the SPS;
2. SPS long-term RP information: long-term reference picture information included in the SPS;
3. SH short-term RPS information: short-term reference picture set information included in the slice header; and
4. SH long-term RP information: long-term reference picture information included in the slice header.

1. SPS Short-Term RPS Information

The SPS short-term RPS information includes information regarding a plurality of short-term reference picture sets which can be used from each picture in which the SPS is referred to. The short-term reference picture set is a set of pictures that can be reference pictures (short-term reference pictures) designated by relative positions (for example, POC differences from the target picture) with respect to the target picture.

The decoding of the SPS short-term RPS information will be described with reference to FIG. 6. FIG. 6 exemplifies a part of an SPS syntax table used at the time of SPS decoding in the header information decoding section 10 and the reference picture information decoding section 13. A part (A) of FIG. 6 corresponds to the SPS short-term RPS information. The SPS short-term RPS information includes the number of short-term reference picture sets (num_short_term_ref_pic_sets) included in the SPS and each piece of short-term reference picture set information (short_term_ref_pic_set(i)).

The short-term reference picture set information will be described with reference to FIG. 7. FIG. 7 exemplifies a syntax table of the short-term reference picture set used at the time of the decoding of the SPS and the decoding of the slice header in the header information decoding section 10 and the reference picture information decoding section 13.

The short-term reference picture set information includes the number of short-term reference pictures (num_negative_picts) of which a display order is earlier than that of the target picture and the number of short-term reference pictures (num_positive_pics) of which a display order is later than that of the target picture. Hereinafter, the short-term reference picture of which the display order is earlier than that of the target picture is referred to as a front short-term reference picture and the short-term reference picture of which the display order is later than that of the target picture is referred to as a rear short-term reference picture.

The short-term reference picture set information includes an absolute value of the POC difference from the target picture (delta_poc_s0_minus1[i]) and presence or absence of possibility to be used as the reference picture of the target picture (used_by_curr_pic_s0_flag[i]) for each front short-term reference picture. The short-term reference picture set information further includes an absolute value of the POC difference from the target picture (delta_poc_s1_minus1[i]) and presence or absence of possibility to be used as the reference picture of the target picture (used_by_curr_pic_s1_flag[i]) for each rear short-term reference picture.

2. SPS Long-Term RP Information

The SPS long-term RP information includes information regarding the plurality of long-term reference pictures which can be used from each picture in which the SPS is referred to. The long-term reference picture refers to a picture designated by an absolute position (for example, the POC) within the sequence.

Referring back to FIG. 6, the decoding of the SPS long-term RP information will be described. A part (B) of FIG. 6 corresponds to the SPS long-term RP information. The SPS long-term RP information includes information (long_term_ref_pics_present_flag) indicating whether there is the long-term reference picture to be transmitted with the SPS, the number of long-term reference pictures included in the SPS (num_long_term_ref_pics_sps), and information regarding each long-term reference picture. The information regarding the long-term reference picture includes the POC of the reference picture (lt_ref_pic_poc_1sb_sps[i]) and presence or absence of possibility to be used as the reference picture of the target picture (used_by_curr_pic_lt_sps_flag[i]).

The POC of the reference picture may be the value itself of the POC associated with the reference picture, or at least significant bit (LSB) of the POC, that is, a remaining value obtained by dividing the POC by a given square of 2, may be used.

3. SH Short-Term RPS Information

The SH short-term RPS information includes information regarding the single short-term reference picture set which can be used from the picture in which the slice header is referred to.

The decoding of the SPS short-term RPS information will be described with reference to FIG. 8. FIG. 8 exemplifies a part of a slice header syntax table used at the time of the decoding of the slice header in the header information decoding section 10 and the reference picture information decoding section 13. A part (A) of FIG. 8 corresponds to the SH short-term RPS information. The SH short-term RPS information includes a flag (short_term_ref_pic_set_sps_flag) indicating whether the short-term reference picture set is selected from the short-term reference picture sets decoded with SPS or is explicitly included in the slice header. When the short-term reference picture set is selected from the short-term reference picture sets decoded with the SPS, an identifier (short_term_ref_pic_set_idx) indicating that one the decoded short-term reference picture sets is selected is included. When the short-term reference picture set is explicitly included in the slice header, information corresponding to the syntax table (short_term_ref_pic_set (idx)) described above with reference to FIG. 7 is included in the SPS short-term RPS information.

4. SH Long-Term RP Information

The SH long-term RP information includes information regarding the long-term reference picture which can be used from the picture in which the slice header is referred to.

Referring back to FIG. 8, the decoding of the SH long-term RP information will be described. A part (B) of FIG. 8 corresponds to the SH long-term RP information. The SH long-term RP information includes the slice header only when the long-term reference picture can be used in the target picture (long_term_ref_pic_present_flag). When one or more long-term reference pictures are decoded with the SPS (num_long_term_ref_pics_sps>0), the number of reference pictures (num_long_term_sps) which can be referred to as the target picture among the long-term reference pictures decoded with the SPS is included in the SH long-term RP information. The number of long-term reference pictures (num_long_term_pics) explicitly transmitted with the slice header is included in the SH long-term RP information. Information (lt_idx_sps[i]) indicating that the long-term reference pictures of the number of the foregoing num_long_term_sps are selected from the long-term reference pictures transmitted with the SPS is further included in the SH long-term RP information. As the information regarding the long-term reference picture explicitly included in the slice header, the POCs (poc_lsb_lt[i]) of the reference pictures and the presence or absence of possibility to be used as the reference pictures of the target pictures (used_by_curr_pic_lt_flag[i]) are included as the number of the foregoing num_long_term_pics.

RPL Modification Information Decoding Process

The RPL modification information is information which is decoded from the SPS or the slice header to construct the reference picture list RPL. The RPL modification information includes SPS list modification information and SH list modification information.

SPS List Modification Information

The SPS list modification information is information that is included in the SPS and is information related to constraints of reference picture list modifications. Referring back to FIG. 6, the SPS list modification information will be described. A part (C) of FIG. 6 corresponds to the SPS list modification information. The SPS list modification information includes a flag (restricted_ref_pic_lists_flag) indicating whether the reference picture list is common to a previous slice included in the picture and a flag (lists_modification_present_flag) indicating whether information regarding list sorting is present within the slice header.

SH List Modification Information

The SH list modification information is information that is included in the slice header and includes update information of the length (reference list length) of the reference picture list applied to the target picture and sorting information (reference list sorting information) of the reference picture lists. The SH list modification information will be described with reference to FIG. 9. FIG. 9 exemplifies a part of the slice header syntax table that is used at the time of the decoding of the slice header in the header information decoding section 10 and the reference picture information decoding section 13. A part (C) of FIG. 9 corresponds to the SH list modification information.

A flag (num_ref_idx_active_override_flag) indicating whether to update a list length is included as reference list length update information. Information (num_ref_idx_l0_active_minus1) indicating the reference list length after modification of the L0 reference list and information (num_ref_idx_l1_active_minus1) indicating the reference list length after modification of the L1 reference list are further included.

Information included as the reference list sorting information in the slice header will be described with reference to FIG. 10. FIG. 10 exemplifies a syntax table of the reference list sorting information used at the time of the decoding of the slice header in the header information decoding section 10 and the reference picture information decoding section 13.

The reference list sorting information includes an L0 reference list sorting presence or absence flag (ref_pic_list_modification_flag_10). The L0 reference list sorting presence or absence flag is a reference picture list sorting presence or absence flag related to the L0 reference list. When the value of this flag is 1 (the L0 reference list is sorted) and NumPocTotalCurr is greater than 2, an L0 reference list sorting order (list_entry_l0[i]) is included in the reference list sorting information. Here, NumPocTotalCurr is a variable indicating the number of reference pictures which can be used for a current picture. Accordingly, when the L0 reference list is sorted and the number of reference pictures which can be used for the current picture is greater than 2, the L0 reference list sorting order is included in the slice header.

Likewise, when the reference picture is a B slice, that is, the L1 reference list can be used for the target picture, an L1 reference list sorting presence or absence flag (ref_pic_list_modification_flag_11) is included in the reference list sorting information. The L1 reference list sorting presence or absence flag is a reference picture list sorting presence or absence flag related to the L1 reference list. When the value of this flag is 1 and NumPocTotalCurr is greater than 2, an L1 reference list sorting order (list_entry_l1[i]) is included in the reference list sorting information. In other words, only when the L1 reference is sorted and the number of reference pictures which can be used for the current picture is greater than 2, the L1 reference list sorting order is included in the slice header.

Details of Reference Picture Set Derivation Process

The details of the process of S15 in the above-described moving image decoding order, that is, the reference picture set derivation process performed by the reference picture set setting section, will be described.

As described above, the reference picture set setting section 14 generates the reference picture set RPS used for the decoding of the target picture based on the RPS information and the information recorded on the decoded picture buffer 12.

The reference picture set RPS is a set of pictures (referable pictures) which can be used as the reference images at the time of decoding in the target picture and a picture subsequent to the target picture in the decoding order. The reference picture set can be classified into the following two subsets according to the kinds of referable pictures:

a current picture referable list ListCurr: a list of the referable pictures in the target picture among the pictures on the decoded image buffer; and a subsequent picture referable list ListFoll: a list of pictures which are not referred to in the target picture and can be referred to in the picture subsequent to the target picture in the decoding order on the decoded image buffer.

The number of pictures included in the current picture referable list is referred to as the number of current picture referable pictures NumCurrList. The above-described NumPocTotalCurr described with reference to FIG. 10 is the same as NumCurrList.

The current picture referable list is configured to include three partial lists:

a current picture long-term referable list ListLtCurr: a current picture referable picture designated by the SPS long-term RP information or the SH long-term RP information;

a current picture short-term front referable list ListStCurrBefore: a current picture referable picture designated by the SPS short-term RPS information or the SH short-term RPS information and earlier than the target picture in the display order; and a current picture short-term rear referable list ListStCurrAfter: a current picture referable picture designated by the SPS short-term RPS information or the SH short-term RPS information and earlier than the target picture in the display order.

The subsequent picture referable list is configured to include two partial lists:

a subsequent picture long-term referable list ListLtFoll: a subsequent picture referable picture designated by the SPS long-term RP information or the SH long-term RP information; and a subsequent picture short-term referable list ListStFoll: a current picture referable picture designated by the SPS short-term RPS information or the SH short-term RPS information.

The reference picture set setting section 14 generates the reference picture set RPS, that is, the current picture short-term front referable list ListStCurBefore, the current picture short-term rear referable list ListStCurrAfter, the current picture long-term referable list ListLtCurr, the subsequent picture short-term referable list ListStFoll, and the subsequent picture long-term referable list ListLtFoll in the following order. The variable NumPocTotalCurr indicating the number of current picture referable pictures is further derived. Each of the referable lists is assumed to be null before the following processes start.

(S201) The single short-term reference picture set used to decode the target picture is specified based on the SPS short-term RPS information and the SH short-term RPS information. Specifically, when the value of short_term_ref_pic_set_sps included in the SH short-term RPS information is 0, the short-term RPS explicitly transmitted with the slice header included in the SH short-term RPS information is selected. In the otherwise case (when the value of short_term_ref_pic_set_sps is 1, the short-term RPS indicated by short_term_ref_pic_set_idx included in the SH short-term RPS information is selected from the plurality of short-term RPSs included in the SPS short-term RPS information.

(S202) The value of the POC of each reference picture included in the selected short-term RPS is derived, and the position of the local decoded image recorded in association with the POC value on the decoded image buffer 12 is detected and is derived as a recording position of the reference picture on the decoded image buffer.

When the reference picture is the front short-term reference picture, the value of the POC of the reference picture is derived by subtracting the value of "delta_poc_s0_minus1[i]+1" from the value of the POC of the target picture. On the other hand, when the reference picture is the subsequent short-term reference picture, the value of the POC of the reference picture is derived by adding the value of "delta_poc_s1_minus1[i]+1" to the value of the POC of the target picture.

(S203) The order in which the front reference pictures included in the short-term RPS is transmitted is confirmed and the front reference pictures are added to the current picture short-term front referable list ListStCurBefore when the value of the associated used_by_curr_pic_s0_flag[i] is 1. In the otherwise case (when the value of used_by_curr_pic_s0_flag[i] is 0), the front reference pictures are added to the subsequent picture short-term referable list ListStFoll.

(S204) The order in which the rear reference pictures included in the short-term RPS are transmitted is confirmed and the subsequent reference pictures are added to the current picture short-term rear referable list ListStCurrAfter when the value of the associated used_by_curr_pic_s1_flag [i] is 1. In the otherwise case (when the value of used_by_curr_pic_s1_flag[i] is 0), the front reference pictures are added to the subsequent picture short-term referable list ListStFoll.

(S205) The short-term reference picture set used to decode the target picture is specified based on the SPS long-term RP information and the SH long-term RP information. Specifically, the reference pictures of the number of num_long_term_sps are selected from the reference pictures included in the SPS long-term RP information and are added to the long-term reference picture set in order. The selected reference pictures are the reference pictures indicated by lt_idx_sps[i]. Subsequently, the reference pictures of the number of num_long_term_pics and the reference pictures included in the SH long-term RP information are added to the long-term reference picture set in order.

(S206) The value of the POC of each reference picture included in the long-term reference picture set is derived, and the position of the local decoded image recorded in association with the POC value on the decoded image buffer 12 is detected and is derived as a recording position of the reference picture on the decoded image buffer.

The POC of the long-term picture is directly derived from the value of the associatively decoded pod_lst_lt[i] or lt_ref_pic_poc_lst_sps[i].

(S207) The reference pictures included in the long-term reference picture set are confirmed in order and the long-term reference pictures are added to the current picture long-term referable list ListLtCurr when the value of the associated used_by_curr_pic_lt_flag[i] or used_by_curr_lt_sps_flag[i] is 1. In the otherwise case (when the value of used_by_curr_pic_lt_flag[i] or used_by_curr_pic_lt_sps_flag[i] is 0), the long-term reference pictures are added to the subsequent picture long-term referable list ListLtFoll.

(S208) The value of the variable NumPocTotalCurr is set as the a sum of the current picture to the referable reference picture. That is, the value of the variable NumPocTotalCurr is set as the sum of the number of elements of three lists, the current picture short-term front referable list ListStCurrBefore, the current picture short-term rear referable list ListStCurrAfter, and the current picture long-term referable list ListLtCurr.

Details of Reference Picture List Construction Process

The details of the process of S16 in the decoding order, that is, the reference picture list construction process, will be described with reference to FIG. 1. As described above, the reference picture list derivation section 15 generates the reference picture list RPL based on the reference picture set RPS and RPL modification information.

The reference picture list is configured to include two lists, an L0 reference list and an L1 reference list. First, a construction order of the L0 reference list will be described. The L0 reference list is constructed in the order indicated in S301 to S307 below.

(S301) The provisional L0 reference list is generated and is initialized to a null list.

(S302) The reference pictures included in the current picture short-term front referable list are added in order to the provisional L0 reference list.

(S303) The reference pictures included in the current picture short-term rear referable list are added in order to the provisional L0 reference list.

(S304) The reference pictures included in the current picture long-term referable list are added in order to the provisional L0 reference list.

(S305) When the reference picture list is modified (the value of lists_modification_present_flag included in the RPL modification information is 1), the following processes of S306a to S306b are performed. Otherwise (the value of lists_modification_present_flag is 0), the process of S307 is performed.

(S306a) When the modification of the L0 reference picture is valid (when the value of ref_pic_list_modification_flag_10 included in the RPL modification information is 1) and a current picture referable picture number NumCurrList is equal to 2, S306b is performed. Otherwise, S306c is performed.

(S306b) The value of the list sorting order list_entry_10[i] included in the RPL modification information is set according to the following expressions. Thereafter, S306c is performed.

$$list\_entry\_10[0]=1$$

$$list\_entry\_10[1]=0$$

(S306c) The elements of the provisional L0 reference list are sorted based on the value of the reference list sorting order list_entry_10[i] and are set to an L0 reference list. The elements RefPicList0[rIdx] of the L0 reference list corresponding to the reference picture index rIdx are derived according to the following expressions. Here, RefListTemp0[i] indicates an i-th element of the provisional L0 reference list.

$$RefPicList0[rIdx]=RefPicListTemp0[list\_entry-10[rIdx]]$$

According to the above expression, in the reference list sorting order list_entry_10[i], the reference picture recorded at the position of the above value in the provisional L0 reference list is stored as the reference picture at the position of rIdx in the L0 reference list with reference to the value recorded at the position indicated by the reference picture index rIdx.

(S307) The provisional L0 reference list is set as the L0 reference list.

Next, the L1 reference list is constructed. The L1 reference list can also be constructed in the same order as that of the L0 reference list. In the construction order (S301 to S307) of the L0 reference list, the L0 reference picture, the L0 reference list, the provisional L0 reference list, list_entry_10 may be substituted with the L1 reference picture, the L1 reference list, the provisional L1 reference list, and list_entry_11, respectively.

Description of Validity and Advantageous Effects of Reference List Modification The reference picture information decoding process and the reference picture list construction process in the moving image decoding device according to the embodiment have been described above. Next, the fact that the reference picture can be modified and the reference picture list modification information can be transmitted with a smaller number of codes through such processes will be described.

Validity of Reference List Modification

Referring to the processes of S305 and S306 in the L0 reference list construction process, the provisional L0 reference list is used directly as the L0 reference list when the L0 reference list is not modified. From this viewpoint, the provisional L0 reference list is a standard (default) L0 reference list used when the sorting is not performed. In this sense, the provisional L0 reference list can also be referred to as the standard L0 reference list.

When the meaning of the list sorting list is confirmed again, the value of list_entry_10[0] is a value indicating at which element the 0-th element of the L0 reference list after the sorting is located in the standard L0 reference list. In general, the value of list_entry_10[i] is a value indicating at which element an i-th element of the L0 reference list after the sorting is located in the standard L0 reference list.

In the process of S306a, the value of list_entry_10[0] is set to 1 and the value of list_entry_10[1] is set to 0 when the modification of the L0 reference list is effective and the value of NumCurrList is 2. In other words, the reference lists are sorted so that the first element of the standard L0 reference list becomes the zeroth element of the L0 reference list and the zeroth element of the standard L0 reference list becomes the first element of the L0 reference list. Here, the number of elements of the L0 reference list is equal to or less than the number of current picture referable pictures (equal to or less than the value of NumCurrList). Accordingly, when the value of NumCurrList is 2, the number of elements of the L0 reference list is equal to or less than 2. Therefore, the L0 reference list sorting information used to sort the L0 reference list is only the first element (list_entry_10[0]) and the second element (list_entry_10[1]) of list_entry10 and the elements subsequent to the third element are not used. In this case, in the sorting of the reference lists, a combination of (list_entry_10[0] and list_entry10[1]) is either O1 or O2 below.

O1: (*L*0List[0],*L*0List[1])=(TmpList[0],TmpList[1])

O2: (*L*0List[0],*L*0List[1])=(TmpList[1],TmpList[0])

When the number of current picture referable pictures is 2 and the L0 reference list is not modified in the above-described reference picture list modification process, the L0 reference list of the foregoing O1 is used. On the other hand, when the L0 reference list is modified, the L0 reference list of the foregoing O2 is used. Accordingly, when the number of current picture referable pictures is 2 in the reference picture list modification process, all of the possible sortings of the L0 reference list can be selected.

Coding Amount of Reference List Modification Information

In S306 a in the L0 reference list construction process, the value of list_entry_10[i] is set directly without using information (that is, a syntax value decoded in the slice header) included in the PRL modification information when the modification of the L0 reference list is effective and the value of NumCurrList is 2. The elements subsequent to the third element (list_entry_10[i] (where i>1)) of the list_entry_10 have not been used. Accordingly, when the modification of the L0 reference list is effective and the value of NumCurrList is 2, it is not necessary to decode the syntax information of list_entry_10 in the slice header. Actually, it has been described that the transmission of list_entry_10[i] is omitted in the decoding process for the RPL modification information described with reference to FIG. 10 when the modification of the L0 reference picture is effective and the value of NumCurrList is 2 (when NumPocTotalCurr is 2). In other words, when the number of current picture referable pictures satisfies a specific condition (when this number is 2), a coding amount related to the transmission of the RPS information is reduced and a coding amount of the slice header is accordingly reduced by omitting signaling of the RPL sorting information.

As described above, in the moving image decoding device according to the embodiment, the reference picture information decoding section omits the decoding of the reference picture sorting information when the number of current picture referable pictures is 2. When the number of current picture referable pictures is 2 and it is necessary to modify the reference list, the reference picture setting section sets the reference picture sorting order such that the first element of the standard reference list becomes the zeroth element and the zeroth element of the standard reference list becomes the first element of the reference list. In this way, the moving image decoding device according to the embodiment reduces the coding amount related to the reference list information while maintaining the function of modifying the reference picture list.

Modification Example 1: Omission of RPL Modification Information when Number of Current Picture Referable Pictures is 1

In the first embodiment, the example in which the RPL modification information is omitted when the number of current picture referable pictures is 2 has been described, but the present invention is not limited thereto. When the number of current picture referable pictures is 1, the RPL modification information may be omitted.

Specifically, in the decoding process for the SH list modification information in the reference picture information decoding section 13, the reference list sorting information is parsed based on the syntax table illustrated in FIG. 11. FIG. 11 exemplifies the syntax table of the reference list sorting information used at the time of the decoding of the slice header.

The L0 reference list sorting presence or absence flag (ref_pic_list_modification_flag_10), the L1 reference list sorting presence or absence flag (ref_pic_list_modification_flag_11), the L0 reference list sorting order (list_entry_10[i]), and the L1 reference list sorting order (list_entry_11[i]) included in the reference list sorting information are decoded only when the number of current picture referable pictures is greater than 1. That is, when the number of current picture referable pictures is 1, the reference list sorting information is not decoded.

When the number of current picture referable pictures is 1, the list length of the reference list is 1 at most, and thus it is not necessary to sort the reference picture list. Accordingly, when the number of current picture referable pictures is 1, it is possible to reduce the coding amount of the slice header by omitting the decoding of the reference picture list sorting presence or absence flag and/or the reference list sorting order.

The example in which the reference list sorting information is substituted with the syntax table illustrated in FIG. 11 has been described. However, the syntax table in FIG. 10 is used as the syntax table of the reference list sorting information, and then a syntax table illustrated in FIG. 12 may be used to decode the slice header. In the syntax table of the slice header illustrated in FIG. 12, the reference list sorting information (ref_pic_list_modification( )) is decoded only when the number of current picture referable pictures (NumPocTotalCurr) is greater than 1.

Modification Example 2: Transmission of NumPocTotalCurr

In Modification Example 1 described above, the example in which the value of the variable NumPocTotalCurr derived based on the RPS information is used as the number of current picture referable pictures has been described, but the present invention is not limited thereto. For example, information corresponding to the number of current picture referable picture may be decoded directly from the coded data to be used.

Specifically, in the decoding process for the SH list modification information in the reference picture information decoding section 13, the reference list sorting information is parsed based on a syntax table illustrated in FIG. 13. FIG. 13 exemplifies the syntax table of the reference list sorting information used at the time of the decoding of the slice header. A difference from the syntax table described in FIG. 10 is that a syntax value num_poc_total_curr is first decoded. Here, num_poc_total_curr is decoded by, for example, a code with a fixed length of 4 bits. The code length of num_poc_total_curr is not necessarily 4 bits. However, when the upper limit of the number of current picture referable pictures is 16, it is preferable to use the fixed length of 4 bits. Unlike the case of FIG. 10, the value of the syntax num_poc_total_curr is used to determine whether the value of the number of current picture referable pictures is greater than 2 in the determination of whether list_entry_10 or list_entry11 is transmitted.

According to the foregoing modification example, it is necessary to add the decoding of the syntax num_poc_total_curr. However, it is not necessary to use the information regarding NumPocTotalCurr derived based on the RPS information at the time of the decoding of the reference picture list modification information (ref_pic_list_modification). Therefore, the slice header including the reference picture list modification information can be parsed with a smaller processing amount. Since the RPS information is included in not only the slice but also the SPS, it is possible to reduce the dependency on the SPS in the parsing of the slice header. In this way, it is possible to obtain the advantageous effect of improving error resistance.

In the foregoing modification example, the example in which the determination according to the number of current picture referable pictures is included directly in the determination expression of the syntax table has been described, but the direct decoding of the syntax num_poc_total_curr is effective even in the other cases. For example, the direct decoding of the syntax num_poc_total_curr is effective even when the syntax element list_entry_10[i] is coded by a code with a variable length based on the number of current picture referable pictures.

As another specific example, the reference list sorting information may be parsed based on the syntax table illustrated in FIG. 14. A difference from the syntax table described in FIG. 13 is that a flag indicating whether to modify the reference list L0 and the reference list L1 is first decoded and the value of the syntax num_poc_total_curr is decoded only when one reference picture list is modified. When the flag is not decoded, the value of num_poc_total_curr is set to 0.

When the reference list is not modified, the reference list sorting information can be parsed even without using the number of current picture referable pictures. Therefore, only when the reference list is modified, it is possible to omit redundancy and reduce the coding amount by decoding the syntax num_poc_total_curr.

As still another example, the reference list sorting information may be parsed based on a syntax table illustrated in FIG. 15. A difference from the syntax table described in FIG. 13 is that a syntax ceil-log2_num_poc_total_curr is decoded instead of the decoding of the syntax num_poc_total_curr and whether to decode the reference list sorting order is determined based on the value. A value V of the syntax ceil-log2_num_poc_total_curr can be derived according to the following expression when N is the number of current picture referable pictures.

$$V = \text{ceil}(\log 2(N))$$

Here, log2(A) indicates a logarithm of (A) with a base 2 and ceil(A) means the largest integer value that does not exceed the value of A. The value of the syntax ceil_log2_num_poc_total_curr corresponds to the number of digits when the number of current picture referable pictures is expressed in binary numbers.

By decoding only information necessary for the parsing in the reference list sorting order without the direct decoding of the number of current picture referable pictures, it is possible to reduce the coding amount compared to the case in which the coding amount of the slice header is directly decoded.

As still another example, the reference list sorting information may be parsed based on a syntax table illustrated in FIG. 16. A difference from the syntax described in FIG. 12 is that the value of a syntax num_poc_total_curr_greater1_flag is decoded in the beginning and whether to decode the reference list modification presence or absence flag and the reference list sorting order is determined based on the value instead of the variable NumPocTotalCurr. Here, the syntax_num_poc_total_curr_greater1_flag indicates whether the number of current picture referable pictures is greater than 1. That is, when the number of current picture referable pictures is equal to or greater than 2, the true is set. When the number of current picture referable pictures is equal to or less than 1, the false is set.

In this case, compared to the case in which the variable NumPocTotalCurr is used, it is possible to obtain the advantageous effects of reducing the parsing process for the slice header and improving error resistance. Further, it is possible to obtain the advantageous effect that an increase in the coding amount of the slice header is less than in the case in which the number of current picture referable pictures is directly decoded.

Modification Example 3: Another Example of Reference Picture List Construction Process The reference picture list construction process described above with reference to FIG. 1 has been described as the process assumed that the length of the L0 reference list is equal to or less than the number of current picture referable pictures, but the present invention is not limited thereto. For example, by directly designating the length of the L0 reference list as reference list length update information by a syntax num_refidx_10_active_minus1, the length of the L0 reference list is greater than the number of current picture referable pictures in some cases. In these cases, the reference picture list (herein, the L0 reference list) can be constructed in the following order.

(S401) The value of an L0 reference list length lenL0 is set to "num_refidx_10_active_minus1+1."

(S402) A L0 referable list is generated and is initialized to a null list.

(S403) The reference pictures included in the current picture short-term front referable list are added to the L0 referable list in order.

(S404) The reference pictures included in the current picture short-term rear referable list are added to the L0 referable list in order.

(S405) The reference pictures included in the current picture long-term referable list are added to the L0 referable list in order.

(S406) when the L0 reference list is modified (when the value of ref_pic_list_modification_flag_10 is 1), S407a is performed. In the other cases, S407b is performed.

(S407a) Integers within a range equal to or greater than 0 and equal to or less than (lenL0-1) are sequentially set to rIdx and the reference picture corresponding to the element at the position of a reference index rIdx of the L0 reference list is set according to the following expression.

RefPicList0[rIdx]=RpsCurrList0[list_entry–10[rIdx]]

In the foregoing expression, RefPicList0[A] indicates an element value at the position of A of the L0 reference list. RpsCurrList0[A] indicates an element value at a position indicated by A of the L0 referable list. The number of elements of the L0 referable list is the same as the number of current picture referable pictures NumPocTotalCurr and a range of the value of list_entry_10[rIdx] is an integer value of a range equal to or greater than 0 and less than NumPocTotalCurr.

According to the above expression, in the reference list sorting order_list_entry_10[i], a value recorded at a position indicated by the reference picture index rIdx is referred to and the reference picture recorded at the position of the value in the L0 referable list is stored as a reference picture at the position of rIdx of the L0 reference list.

(S407b) Integers within a range equal to or greater than 0 and equal to or less than (lenL0-1) are sequentially set to rIdx and the reference picture corresponding to the element at the position of a reference index rIdx of the L0 reference list is set according to the following expression.

RefPicList0[rIdx]=RpsCurrList0[rIdx % NumPocTotalCurr]

According to the above expression, the reference picture associated with the position of rIdx in the L0 reference list is a picture recorded at a position of a remainder obtained by dividing rIdx in the L0 referable list by the number of current picture referable pictures, that is, a remainder obtained by dividing the reference image index by the length of the L0 reference list.

In other words, the reference picture list is set with reference to the elements of the referable list (the L0 referable list) generated by sorting the current picture referable pictures in a given priority order. In the generation of the L0 reference list (basic L0 reference list) when the L0 reference list is not modified in S407b, the reference is made by the remaining value obtained by dividing the value the reference index rIdx by the number of current picture referable pictures.

In the foregoing example, the number of elements of the L0 referable list RpsCurrList0 has been set to NumPocTotalCurr, but the length of the referable list can also be set to L0 reference list length LenL0 instead. However, since the L0 referable list can be generated without dependency on the length of the reference list likely to be updated in the slice unit, it is preferable to set the number of elements of the L0 referable list RpsCurrList0 to NumPocTotalCurr.

By constructing the L0 reference list in the foregoing order, it is possible to construct the L0 reference list even when the length of the L0 reference list increases from the number of current picture referable pictures.

The L0 reference list has been described above, but the same description is also established in the L1 reference list.

Moving Image Coding Device

Figure 17:
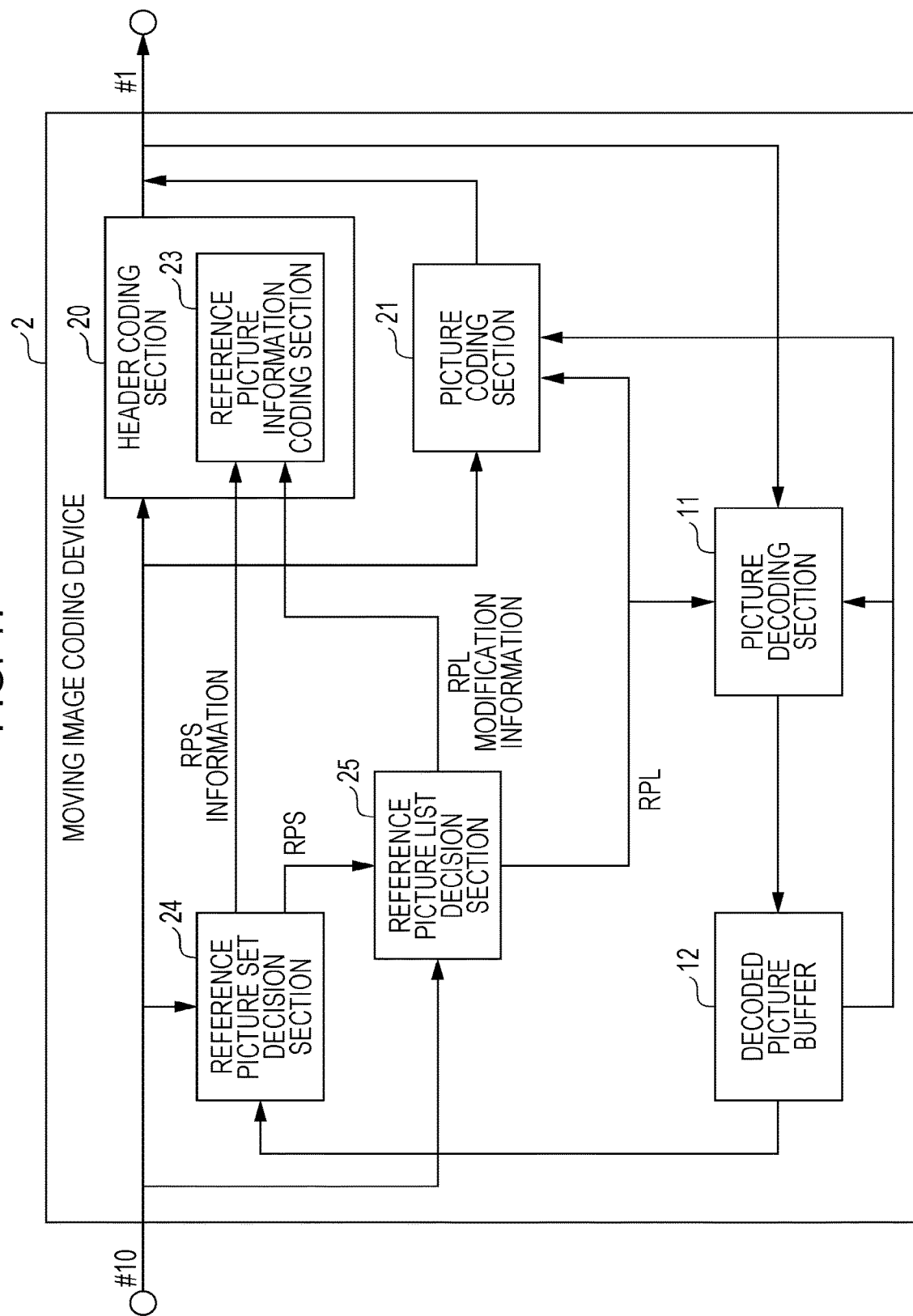
FIG. 17 is a functional block diagram illustrating a schematic configuration of a moving image coding device according to the embodiment of the present invention.

Hereinafter, the moving image coding device 2 according to the embodiment will be described with reference to FIG. 17.

Overview of Moving Image Coding Device

Roughly speaking, the moving image coding device 2 is a device that generates coded data #1 by coding input image #10 and outputs the coded data #1.

Configuration of Moving Image Coding Device

First, a configuration example of the moving image coding device 2 will be described with reference to FIG. 17. FIG. 17 is a functional block diagram illustrating the configuration of the moving image coding device 2. As illustrated in FIG. 17, the moving image coding device 2 includes a picture decoding section 11, a decoded picture buffer 12, a header coding section 20, a picture coding section 21, a reference picture set decision section 24, and a reference picture list decision section 25. The header coding section 20 includes a reference picture information coding section 23 therein. The picture decoding section 11 and the decoded picture buffer 12 are the same as the constituent elements with the same names described in FIG. 2, and thus the description thereof will be omitted.

The header coding section 20 generates and codes the SPS, the PPS, and the slice header based on the input image #10 and outputs the SPS, the PPS, and the slice header.

The reference picture information coding section 23 is included in the header coding unit 16. The reference picture information coding section 23 performs a reference picture information coding process based on the reference picture set RPS and the reference picture list RPL to generate the RPS information and the RPL modification information included in the SPS and the slice header.

The picture coding section 21 codes each picture based on the input image #10 and the reference picture list RPL and outputs each picture.

The reference picture set decision section 24 decides and outputs the reference picture set RPS used in the coding and the local decoding of the coding target picture based on the input image #10 and the local decoded image recorded on the decoded picture buffer 12.

The reference picture list decision section 25 decides and outputs the reference picture list RPL used in the coding and the local decoding of the coding target picture based on the input image #10 and the reference picture set.

Correspondence Relation with Moving Image Decoding Device

The moving image coding device 2 has the configuration corresponding to each configuration of the moving image decoding device 1. Here, the correspondence means a relation in which the same process or its reverse process is performed.

For example, the reference picture information decoding process of the reference picture information decoding section 13 included in the moving image decoding device 1 is the same as the reference picture information coding process of the reference picture information coding section 23 included in the moving image coding device 2. More specifically, the reference picture information decoding section 13 generates the RPS information and the modification RPL information as the syntax value decoded from the SPS or the slice header. On the other hand, the reference picture information coding section 23 codes the input RPS information and modification RPL information as the syntax values of the SPS and the slice header.

For example, in the moving image decoding device 1, a process of decoding the syntax value from a bit string corresponds to a process of coding the bit string from the syntax value and its reverse process in the moving image coding device 2.

Flow of Process

An order in which the moving image coding device 2 generates the output coded data #1 from the input image #10 is as follows.

(S21) The following processes of S22 to S29 are performed on each picture (target picture) configuring the input image #10.

(S22) The reference picture set decision section 24 decides the target picture in the input image #10 and the reference picture set RPS based on the local decoded image recorded on the decoded picture buffer 12 and outputs the target picture and the reference picture set RPS to the reference picture list decision section 25. The RPS information necessary to generate the reference picture set RPS is derived and output to the reference picture information coding section 23.

(S23) The reference picture list decision section 25 derives the reference picture list RPL based on the target picture in the input image #10 and the input reference picture set RPS and outputs the reference picture list RPL to the picture coding section 21 and the picture decoding section 11. The RPL modification information necessary to generate the reference picture list RPL is derived and output to the reference picture information coding section 23.

(S24) The reference picture information coding section 23 generates the RPS information and the RPL modification information to be included in the SPS or the slice header based on the reference picture set RPS and the reference picture list RPL.

(S25) The header coding section 20 generates the SPS to be applied to the target picture based on the input image #10 and the RPS information and the RPL modification information generated by the reference picture coding section 21 and outputs the SPS.

(S26) The header coding section 20 generates the PPS to be applied to the target picture based on the input image #10 and outputs the PPS.

(S27) The header coding section 20 codes the slice header of each slice configuring the target picture based on the input image #10 and the RPS information and the RPL modification information generated by the reference picture coding section 21, outputs the slice header as a part of the coded data #1 to the outside, and outputs the slice header to the picture decoding section 11.

(S28) The reference picture coding section 21 generates the slice data of each slice configuring the target picture based on the input image #10, outputs the slice data as a part of the coded data #1 to the outside, and outputs the slice data to the picture decoding section 11.

(S29) The picture decoding section 11 generates the local decoded image of the target picture from the coded data #1 based on the slice data of each slice included in the target picture and the reference picture list RPL and records the local decoded image on the decoded picture buffer in association with the POC of the target picture.

Application Examples

The moving image coding device 2 and the moving image decoding device 1 described above can be mounted to be used in various apparatuses transmitting, receiving, recording, and reproducing a moving image. The moving image may be a natural moving image captured by a camera or the like or may be an artificial moving image (including a CG and a GUI) generated by a computer or the like.

First, the fact that the moving image coding device 2 and the moving image decoding device 1 described above can be used to transmit and receive a moving image will be described with reference to FIG. 18.

Figure 18:
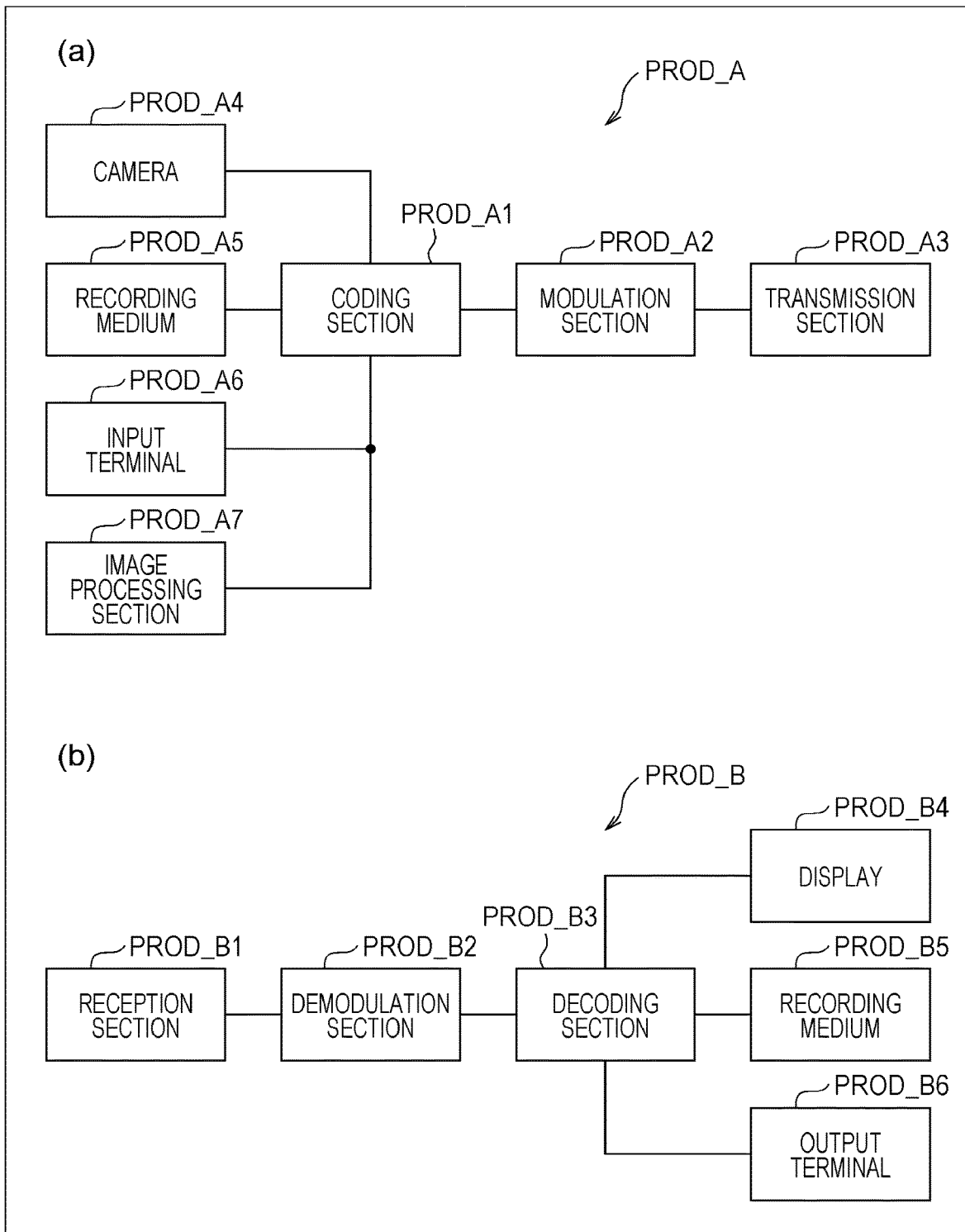
FIG. 18 is a diagram illustrating configuration examples of a transmission apparatus on which the moving image coding device is mounted and a reception apparatus on which the moving image decoding device is mounted. (a) of FIG. 18 illustrates the transmission apparatus on which the moving image coding device is mounted and (b) of FIG. 18 illustrates the reception apparatus on which the moving image decoding device is mounted.

(a) of FIG. 18 is a block diagram illustrating the configuration of a transmission apparatus PROD_A on which the moving image coding device 2 is mounted. As illustrated in (a) of FIG. 18, the transmission apparatus PROD_A includes a coding section PROD_A1 that obtains coded data by coding a moving image, a modulation section PROD_A2 that obtains a modulated signal by modulating a carrier wave with the coded data obtained by the coding section PROD_A1, and a transmission section PROD_A3 that transmits the modulated signal obtained by the modulation section PROD_A2. The above-described moving image coding device 2 is used as the coding section PROD_A1.

The transmission apparatus PROD_A may further include a camera PRODA4 that captures a moving image as a supply source of a moving image input to the coding section PROD_A1, a recording medium PROD_A5 that records the moving image, an input terminal PROD_A6 that inputs the moving image from the outside, and an image processing section A7 that generates or processes an image. In (a) of FIG. 18, the configuration of the transmission apparatus PROD_A including all of the sections is exemplified, but some of the sections may be omitted.

The recording medium PROD_A5 may be a recording medium that records an uncoded moving image or may be a recording medium that records a moving image coded according to a coding scheme for recording different from a coding scheme for transmission. In the latter case, a decoding section (not illustrated) that decodes coded data read from the recoding medium PROD_A5 according to the coding scheme for recording may be interposed between the recording medium PROD_A5 and the coding section PROD_A1.

(b) of FIG. 18 is a block diagram illustrating a reception apparatus PROD_B on which the moving image decoding device 1 is mounted. As illustrated in (b) of FIG. 18, the reception apparatus PROD_B includes a reception section PROD_B1 that receives a modulated signal, a demodulation section PROD_B2 that obtains coded data by demodulating the modulated signal received by the reception section PROD_B1, and a decoding section PROD_B3 that obtains a moving image by decoding the coded data obtained by the demodulation section PROD_B2. The above-described moving image decoding device 1 is used as the decoding section PROD_B3.

The reception apparatus PROD_B may further include a display PROD_B4 that displays the moving image as a supply destination of the moving image output by the decoding section PROD_B3 a recording medium PROD_B5 that records the moving image, and an output terminal PROD_B6 that outputs the moving image to the outside. In (b) of FIG. 18, the configuration of the reception device PROD_B including all of these sections is exemplified, but some of the sections may be omitted.

The recording medium PROD_B5 may be a recording medium that records an uncoded moving image or may be a recording medium that records a moving image coded according to a coding scheme for recording different from a coding scheme for transmission. In the latter case, a coding section (not illustrated) that codes the moving image acquired from the decoding section PROD_B3 according to the coding scheme for recording may be interposed between the decoding section PROD_B3 and the recording medium PROD_B5.

A transmission medium through which a modulated signal is transmitted may be a wireless medium or a wired medium. A transmission form in which a modulated signal is transmitted may be broadcasting (here, a transmission form in which a transmission designation is not specified in advance) or may be communication (here, a transmission form in which a transmission destination is specified in advance). That is, the transmission of the modulated signal may be realized by any one of wireless broadcasting, wired broadcasting, wireless communication, and wired communication.

For example, a broadcast station (broadcast equipment or the like)/reception station (a television receiver or the like) for terrestrial digital broadcasting is an example of the transmission apparatus PROD_A/reception apparatus PROD_B transmitting or receiving a modulated signal by wireless broadcasting. Further, a broadcast station (broadcast equipment or the like)/reception station (television receiver or the like) for cable television broadcasting is an example of the transmission apparatus PROD_A/reception apparatus PROD_B transmitting or receiving a modulated signal by wired broadcasting.

A server (a workstation or the like)/client (a television receiver, a personal computer, a smartphone, or the like) for a Video On Demand (VOD) service in which the Internet is used, a moving image sharing service, or the like is an example of the transmission apparatus PROD_A/reception apparatus PROD_B transmitting or receiving a modulated signal by communication (typically, one of wireless and wired media is used as a transmission medium in a LAN and a wired medium is used as a transmission medium in a WAN). Here, the personal computer includes a desktop PC, a laptop PC, and a tablet PC. The smartphone also includes a multi-function portable phone terminal.

The client for the moving image sharing service has not only a function of decoding coded data downloaded from the server and displays the coded data on a display but also a function of coding a moving image captured by a camera and uploading the coded moving image to the server. That is, the client for the moving image sharing service functions as both of the transmission apparatus PROD_A and the reception apparatus PROD_B.

Next, the fact that the moving image coding device 2 and the moving image decoding device 1 described above can be used to record and reproduce a moving image will be described with reference to FIG. 19.

Figure 19:
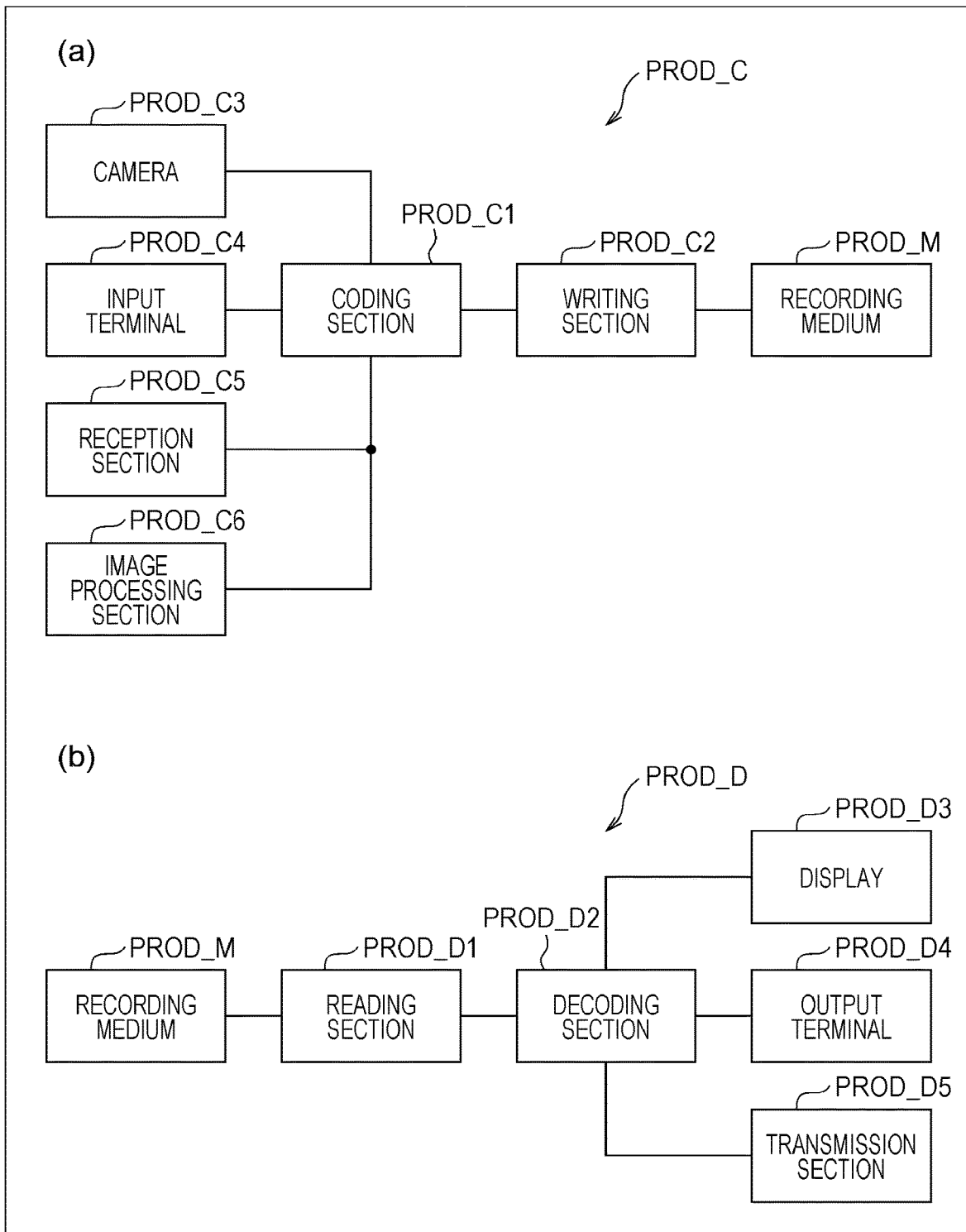
FIG. 19 is a diagram illustrating configuration examples of a recording apparatus on which the moving image coding device is mounted and a reproduction apparatus on which the moving image decoding device is mounted. (a) of FIG. 19 illustrates the recording apparatus on which the moving image coding device is mounted and (b) of FIG. 19 illustrates the reproduction apparatus on which the moving image decoding device is mounted.

(a) of FIG. 19 is a block diagram illustrating the configuration of a recording apparatus PROD_C on which the above-described moving image coding device 2 is mounted. As illustrated in (a) of FIG. 19, the recording apparatus PROD_C includes a coding section PROD_C1 that obtains coded data by coding a moving image and a writing section PROD_C2 that writes the coded data obtained by the coding section PROD_C1 on a recording medium PROD_M. The above-described moving image coding device 2 is used as the coding section PROD_C1.

The recording medium PROD_M may be (1) a type of medium that is included in the recording apparatus PROD_C, such as a hard disk drive (HDD) or a solid state drive (SSD), may be (2) a type of medium that is connected to the recording apparatus PROD_C, such as an SD memory card or a Universal Serial Bus (USB) flash memory, or may be (3) a medium that is loaded on a drive device (not illustrated) included in the recording apparatus PROD_C, such as a Digital Versatile Disc (DVD) or a Blu-ray (registered trademark) disc (BD).

The recording apparatus PROD_C may further include a camera PROD_C3 that captures a moving image as a supply source of a moving image to be input to the coding section PROD_C1, an input terminal PROD_C4 that inputs a moving image from the outside, a reception section PROD_C5 that receives a moving image, and an image processing section C6 that generates or processes an image. In (a) of FIG. 19, the configuration of the recording apparatus PROD_C including all of the sections is exemplified, but some of the sections may be omitted.

The reception section PROD_C5 may be a reception section that receives an uncoded moving image or may be a reception section that receives coded data coded according to a coding scheme for transmission different from a coding scheme for recording. In the latter case, a decoding section (not illustrated) for transmission that decodes the coded data coded according to the coding scheme for transmission may be interposed between the reception section PROD_C5 and the coding section PROD_C1.

As the recording apparatus PROD_C, for example, a DVD recorder, a BD recorder, and a Hard Disk Drive (HDD) recorder can be exemplified (in this case, the input terminal PROD_C4 or the reception PROD_C5 is a main supply source of a moving image). A camcorder (in this case, the camera PROD_C3 is a main supply source of a moving image), a personal computer (in this case, the reception section PROD_C5 or the image processing section C6 is a main supply source of a moving image), a smartphone (in this case, the camera PROD_C3 or the reception section PROD_C5 serves a main supply source of a moving image), and the like are also examples of the recording apparatus PROD_C.

(b) of FIG. 19 is a block diagram illustrating the configuration of a reproduction apparatus PROD_D on which the above-described moving image decoding device 1 is mounted. As illustrated in (b) of FIG. 19, the reproduction apparatus PROD_D includes a reading section PROD_D1 that reads coded data written on a recording medium PROD_M and a decoding section PROD_D2 that obtains a moving image by decoding the coded data read by the reading section PROD_D1. The above-described moving image decoding device 1 is used as the decoding section PROD_D2.

The recording medium PROD_M may be (1) a type of medium that is included in the reproduction apparatus PROD_D, such as an HDD or an SSD, may be (2) a type of medium that is connected to the reproduction apparatus PROD_D, such as an SD memory card or a USB flash memory, or may be (3) a medium that is loaded on a drive device (not illustrated) included in the reproduction apparatus PROD_D, such as a DVD or a BD.

The reproduction apparatus PROD_D may further includes a display PROD_D3 that displays a moving image as a supply destination of the moving image output by the decoding section PROD_D2, an output terminal PROD_C4 that outputs the moving image to the outside, and a transmission section PROD_D5 that transmits the moving image. In (b) of FIG. 19, the configuration of the reproduction apparatus PROD_D including all of the sections is exemplified, but some of the sections may be omitted.

The transmission section PROD_D5 may be a transmission section that transmits an uncoded moving image or may be a transmission section that transmits the coded data coded according to a coding scheme for transmission different from a coding scheme for recording. In the latter case, a coding section (not illustrated) that codes a moving image according to the coding scheme for transmission may be interposed between the decoding section PROD_D2 and the transmission section PROD_D5.

As the reproduction apparatus PROD_D, for example, a DVD player, a BD player, and an HDD player can be exemplified (in this case, the output terminal PROD_D4 connected to a television receiver or the like is a main supply destination of a moving image). A television receiver (in this case, the display PROD_D3 is a main supply destination of a moving image), a digital signage (which is also referred to as an electronic signboard or an electronic bulletin board and the display PROD_D3 or the transmission section PROD_D5 is a main supply destination of a moving image), a desktop PC (in this case, the output terminal PROD_D4 or the transmission section PROD_D5 is a main supply destination of a moving image), a laptop or tablet PC (in this case, the display PROD_D3 or the transmission section PROD_D5 is a main supply destination of a moving image), a smartphone (in this case, the display PROD_D3 or the transmission section PROD_D5 is a main supply destination of a moving image), and the like are examples of the reproduction apparatus PROD_D.

Conclusion

As described above, according to an aspect of the present invention, there is provided an image decoding device generating a predicted image through motion compensation prediction with reference to one or more reference images recorded on a decoded picture buffer and using the predicted image in image decoding. The image decoding device includes: reference picture set derivation means for deriving a reference picture set to be applied to a target picture; reference picture list generation means for generating a reference picture list available in the target picture based on reference picture list (RPL) modification information decoded from a slice header and the reference picture set derived by the reference picture set derivation means; and reference picture information decoding means for omitting decoding of a part of information included in the RPL modification information based on the number of current picture referable pictures.

The RPL modification information may include at least a reference picture list sorting presence or absence flag and a reference list sorting order. The reference picture information decoding means may omit the decoding of at least one of the reference picture list sorting presence or absence flag and the reference list sorting order based on the number of current picture referable pictures.

The reference picture information decoding means may omit the decoding of the reference picture list sorting presence or absence flag and the reference list sorting order when the number of current picture referable pictures is 1.

The number of current picture referable pictures may be decoded by the reference picture information decoding means.

According to another aspect of the present invention, there is provided an image decoding device generating a predicted image through motion compensation prediction with reference to one or more reference images recorded on a decoded picture buffer and using the predicted image in image decoding. The image decoding device includes: reference picture set derivation means for deriving a reference picture set to be applied to a target picture based on reference picture set (RPS) information decoded from a sequence parameter set (SPS) or a slice header; reference picture list generation means for generating a reference picture list available in the target picture based on reference picture list (RPL) modification information decoded from the SPS or the slice header and the reference picture set derived by the reference picture set derivation means; and reference picture information decoding means for omitting decoding of at least one of a reference list sorting presence or absence flag (also referred to as a reference picture list sorting presence or absence flag) and a reference list sorting order based on the number of current picture referable pictures.

In the foregoing configuration, the decoding of at least one of the reference list sorting presence or absence flag and the reference list sorting order is omitted based on the number of current picture referable pictures. Accordingly, it is possible to prevent information regarding the reference picture unnecessary in the decoding from being transmitted, and thus it is possible to decode a moving image with a header information of a smaller coding amount.

In the image decoding device according to the present invention, the reference picture information decoding means may omit the decoding of the reference list sorting order when the number of current picture referable pictures is 2. The reference picture list generation means may generate a reference picture list of the reference list sorting order which is an order in which an order of elements of the reference picture list after sorting is different from a standard reference picture list when the number of current picture referable pictures is 2.

In the foregoing configuration, when the number of current picture referable pictures is 2, it is possible to select the proper reference picture list, and thus it is possible to decode a moving image using the proper reference picture list.

In the image decoding device according to the aspect of the present invention, the reference picture information decoding means may omit the decoding of the reference list sorting presence or absence flag and the reference list sorting order when the number of current picture referable pictures is 1.

When the number of current picture referable pictures is 1, the list length of the reference list is 1 at most and it is not necessary to sort the reference picture list. In the foregoing configuration, when the number of current picture referable pictures is 1, decoding of the the reference picture list sorting presence or absence flag and the reference list sorting order are omitted. Therefore, it is possible to reduce a coding amount of the slice header.

In the image decoding device according to the aspect of the present invention, the number of current picture referable pictures may be decoded by the reference picture information decoding means.

In the foregoing configuration, it is possible to parse the slice header including the reference picture list modification information with a small processing amount. Further, it is possible to reduce the dependency on the sequence parameter set SPS in the parsing of the slice header. Thus, it is possible to achieve an improvement in error resistance.

According to still another aspect of the present invention, there is provided an image coding device generating a predicted image through motion compensation prediction with reference to one or more reference images recorded on a decoded picture buffer and using the predicted image in image coding. The image coding device includes: a reference picture set decision mechanism that decides a reference picture set and a reference picture list to be applied to a target picture; and a reference picture information coding mechanism that omits coding of at least one of a reference list sorting presence or absence flag and a reference list sorting order based on the number of current picture referable pictures.

In the foregoing configuration, the coding of at least one of the reference list sorting presence or absence flag and the reference list sorting order is omitted based on the number of current picture referable pictures. Accordingly, it is possible to prevent information regarding the reference picture unnecessary in the decoding from being transmitted, and thus it is possible to generate the coded data so that a moving image is decoded with a header information of a smaller coding amount.

Realization by Hardware and Realization by Software

Each block of the moving image decoding device 1 and the moving image coding device 2 described above may be realized by hardware such as a logical circuit formed on an integrated circuit (IC chip) or may be realized by software using a central processing unit (CPU).

In the latter case, each of the foregoing devices includes a CPU that executes a command of a program realizing each function, a read-only memory (ROM) that stores the program, a random access memory (RAM) on which the program is loaded, and a storage device (recording medium) such as a memory that stores the program and various kinds of data. An object of the present invention can also be achieved by providing each of the foregoing devices with a recording medium that records a program code (an execution format program, an intermediate code program, or a source program) of a control program of each of the foregoing devices which is software realizing the above-described functions in a computer-readable manner and by causing a computer (a CPU or an MPU) to read and execute the program code recorded on the recording medium.

As the recording medium, for example, a kind of tape such as a magnetic tape or a cassette tape, a kind of disc including a magnetic disk such as floppy (registered trademark) disk/hard disk and an optical disc such as Compact Disc Read-Only Memory (CD-ROM)/Magneto-Optical Disc (MO discs)/Mini Disc (MD)/Digital Versatile Disc (DVD)/CD Recordable (CD-R)/Blu-ray (registered trademark) Disc, a kind of card such as an IC card (including a memory card)/optical card, a kind of semiconductor memory such as mask ROM/Erasable Programmable Read-Only Memory (EPROM)/Electrically Erasable and Programmable Read-Only Memory (EEPROM) (registered trademark)/flash ROM, or a kind of logical circuit such as a Programmable Logic device (PLD) or a Field Programmable Gate Array (FPGA) can be used.

Each of the foregoing devices may be configured to be connected to a communication network and the program code may be supplied via the communication network. The communication network may be able to transmit the program code and is not particularly limited. For example, the Internet, an intra-net, an extra-net, a Local Area Network (LAN), an Integrated Services Digital Network (ISDN), a Value-Added Network (VAN), a Community Antenna television/Cable Television (CATV) communication network, a virtual private network, a telephone circuit network, a mobile communication network, or a satellite communication network can be used. A transmission medium configuring the communication network may be a medium capable of transmitting the program code and is not particularly limited to a specific configuration or a kind of medium. For example, a wired medium such as Institute of Electrical and Electronic Engineers (IEEE) 1394, a USB, power line broadcasting, a cable TV circuit line, a telephone line, or an Asymmetric Digital Subscriber Line (ADSL) circuit, an infrared medium such as Infrared Data Association (IrDA) or a remote controller, or a wireless medium such as Bluetooth (registered trademark), IEEE 802.11 wireless, High Data Rate (HDR), Near Field Communication (NFC), Digital Living Network Alliance (DLNA) (registered trademark), a portable telephone network, a satellite circuit, or a terrestrial digital network can be used. The present invention can also be realized in a form of a computer data signal in which the program code is embodied through electronic transmission and is embedded in a carrier wave.

The present invention is not limited to the above-described embodiments, but may be modified in various forms within the scope indicated by the claims. That is, embodiments obtained by combining technical mechanisms properly changed within the scope indicated by the claims are included in the technical scope of the present invention. By combining technical mechanisms disclosed in the respective embodiments, it is possible to achieve new technical features.

INDUSTRIAL APPLICABILITY

The present invention can be properly applied to an image decoding device decoding coded data coded from image data and an image coding device generating the coded data coded from the image data. Further, the present invention can be properly applied to a data structure of coded data generated by the image coding device and referred to by the image decoding device.

REFERENCE SIGNS LIST

1 MOVING IMAGE DECODING DEVICE (IMAGE DECODING DEVICE)
2 MOVING IMAGE CODING DEVICE (IMAGE CODING DEVICE)

10 HEADER DECODING SECTION
11 PICTURE DECODING SECTION
12 DECODED PICTURE BUFFER
13 REFERENCE PICTURE INFORMATION DECODING SECTION (REFERENCE PICTURE INFORMATION DECODING MEANS)
14 REFERENCE PICTURE SET SETTING SECTION (REFERENCE PICTURE SET DERIVATION MEANS)
15 REFERENCE PICTURE LIST DERIVATION SECTION (REFERENCE PICTURE LIST GENERATION MEANS)
20 HEADER CODING SECTION
21 PICTURE CODING SECTION
23 REFERENCE PICTURE INFORMATION CODING SECTION (REFERENCE PICTURE INFORMATION CODING MECHANISM)
24 REFERENCE PICTURE SET DECISION SECTION (REFERENCE PICTURE SET DECISION MECHANISM)
25 REFERENCE PICTURE LIST DECISION SECTION

What is claimed is:

1. An image decoding method comprising:
receiving a bitstream comprising one or more coding parameters used in decoding a target picture of a video sequence
deriving, based on the bitstream, a reference picture set to be applied to the target picture;
generating a reference picture list based on reference picture list (RPL) modification information decoded from a slice header and the reference picture set;
determining a value of a first flag included in the one or more coding parameters, the first flag indicating whether information regarding list sorting is present within the slice header;
omitting decoding of a part of information included in the RPL modification information,
wherein the RPL modification information includes at least a reference picture list sorting presence or absence flag and a reference list sorting order, and
wherein decoding of the reference picture list sorting presence or absence flag and the reference list sorting order is omitted based on a number of current picture referable pictures and the value of the first flag; and
generating a decoded image of the target picture based on the generated reference picture list.

2. The method of claim 1, wherein the reference picture list sorting presence or absence flag is decoded from the bitstream upon determining that the number of current picture referable pictures is greater than 1, and that the first flag has a non-zero value.

3. The method of claim 1, wherein the one or more coding parameters are included in a sequence parameter set (SPS).

4. The method of claim 1, further comprising generating a predicted image based on a decoded portion of the RPL modification information.

5. The method of claim 4, further comprising decoding the target picture based on the predicted image.

* * * * *